US011323893B2

(12) United States Patent
Nakayama

(10) Patent No.: US 11,323,893 B2
(45) Date of Patent: May 3, 2022

(54) WIRELESS COMMUNICATION DEVICE, CONTROL DEVICE, AND CONTROL METHOD

(71) Applicant: Sony Corporation, Tokyo (JP)

(72) Inventor: Takashi Nakayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/772,175

(22) PCT Filed: Apr. 18, 2018

(86) PCT No.: PCT/JP2018/015989
§ 371 (c)(1),
(2) Date: Jun. 12, 2020

(87) PCT Pub. No.: WO2019/123675
PCT Pub. Date: Jun. 27, 2019

(65) Prior Publication Data
US 2021/0076226 A1 Mar. 11, 2021

Related U.S. Application Data

(60) Provisional application No. 62/608,955, filed on Dec. 21, 2017.

(51) Int. Cl.
*H04W 16/28* (2009.01)
*H04B 7/06* (2006.01)
(Continued)

(52) U.S. Cl.
CPC ............ *H04W 16/28* (2013.01); *H04B 7/06* (2013.01); *H04B 7/08* (2013.01); *H04W 48/20* (2013.01)

(58) Field of Classification Search
CPC ........ H04W 16/28; H04W 48/20; H04B 7/06; H04B 7/08; H04B 7/086; H04B 7/088;
(Continued)

(56) References Cited

U.S. PATENT DOCUMENTS

2003/0232633 A1 12/2003 Iida et al.
2012/0064841 A1\* 3/2012 Husted ................. H01Q 3/2605
455/78
(Continued)

FOREIGN PATENT DOCUMENTS

JP 2004-064741 A 2/2004
JP 2005-217929 A 8/2005
(Continued)

OTHER PUBLICATIONS

International Search Report and Written Opinion dated Jul. 17, 2018 for PCT/JP2018/015989 filed on Apr. 18, 2018, 10 pages including English Translation of the International Search Report.
(Continued)

*Primary Examiner* — Fred A Casca
(74) *Attorney, Agent, or Firm* — Xsensus LLP

(57) ABSTRACT

It is possible to realize wireless communication using a directional beam in a more suitable manner.

A wireless communication device includes: one or more antenna elements that are configured to control directions of directional beams and perform wireless communication using the directional beams; a detection unit that detects an attitude of at least any one of the one or more antenna elements; and a control unit that sets a state in which a radio signal transmitted using at least a directional beam from a base station is receivable via any one of the one or more antenna elements as a reference state, and controls the wireless communication with the base station using the directional beam according to a change in the attitude from the reference state.

13 Claims, 28 Drawing Sheets

(51) Int. Cl.
*H04B 7/08* (2006.01)
*H04W 48/20* (2009.01)

(58) Field of Classification Search
CPC .. H04B 7/0617; H04B 7/0452; H04B 7/0626; H04B 7/0456; H04B 7/0413; H04B 7/0632; H04B 7/0639; H04B 7/024; H04B 7/0417; H04B 7/0695; H04B 7/043; H04B 7/0619; H04B 7/0469; H04B 7/04; H04B 7/0408; H04B 7/0697; H04B 7/0897; H04B 7/10; H04B 7/02; H04L 5/0048; H04L 5/0023; H04L 25/0204
See application file for complete search history.

(56) References Cited

U.S. PATENT DOCUMENTS

| | | |
|---|---|---|
| 2013/0040682 A1 | 2/2013 | Chang et al. |
| 2013/0156080 A1* | 6/2013 | Cheng .................... H01Q 1/243 375/222 |
| 2017/0155439 A1* | 6/2017 | Chang .................... H01Q 1/246 |
| 2018/0199358 A1* | 7/2018 | Moosavi ........... H04W 72/1231 |

FOREIGN PATENT DOCUMENTS

| | | |
|---|---|---|
| JP | 2005252844 A | 9/2005 |
| JP | 2009044667 A | 2/2009 |
| JP | 2012-044596 A | 3/2012 |
| JP | 2014-527749 A | 10/2014 |

OTHER PUBLICATIONS

Suyama, S., et al., "5G Multi-antenna Technology," NTT Docomo Technical Journal, vol. 23, No. 4, 2016, pp. 30-39.
ITL, "On NR-SS structure and time indexing," 3GPP TSG-RAN WG2 Meeting #88, R1-1703422, Athens, Greece, Feb. 13-17, 2017, 7 pages.
Extended European Search Report dated Dec. 11, 2020, in corresponding European Patent Application No. 18892092.0.
ITL, On NR-SS structure and time indexing[online], 3GPP TSG RAN WG1 Meeting #88 R1-1703422<URL:http://www.3gpp.org/ftp/tsg_ra.

* cited by examiner

FIG. 15
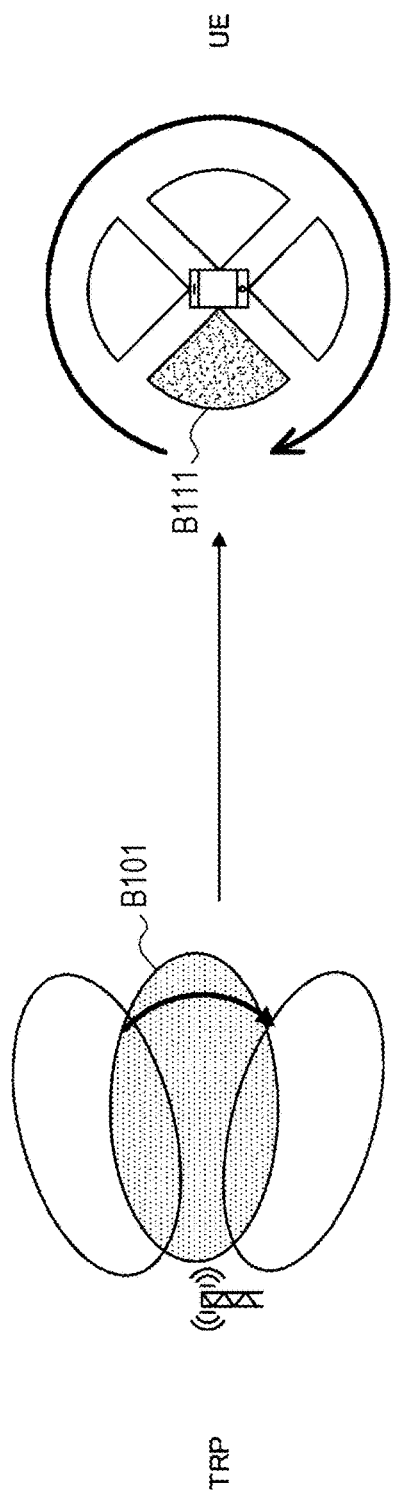
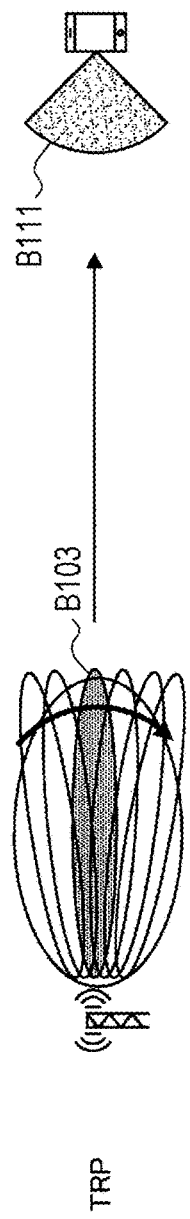
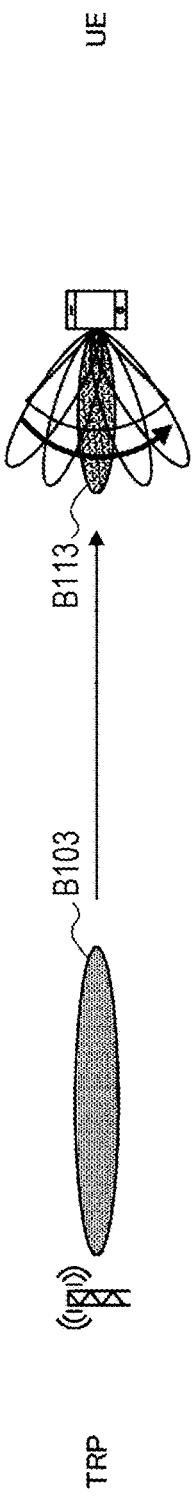

FIG. 19
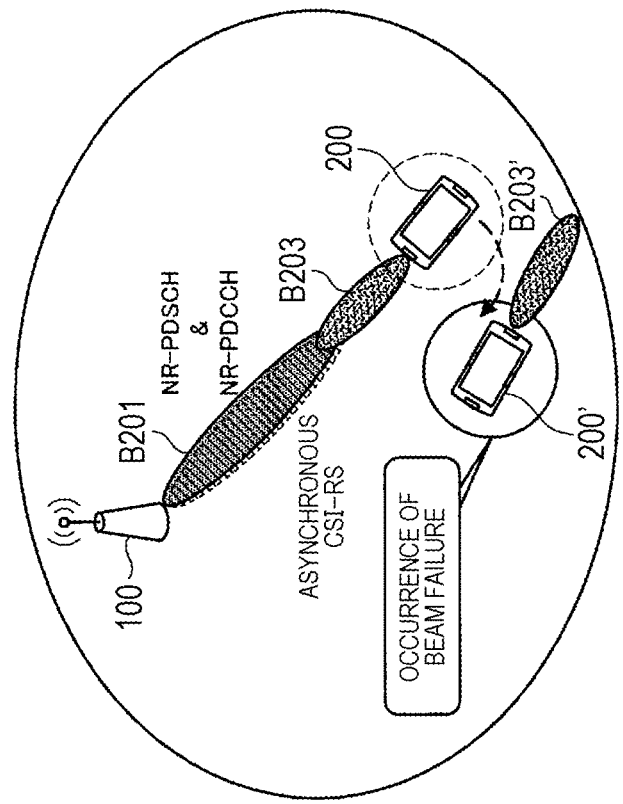
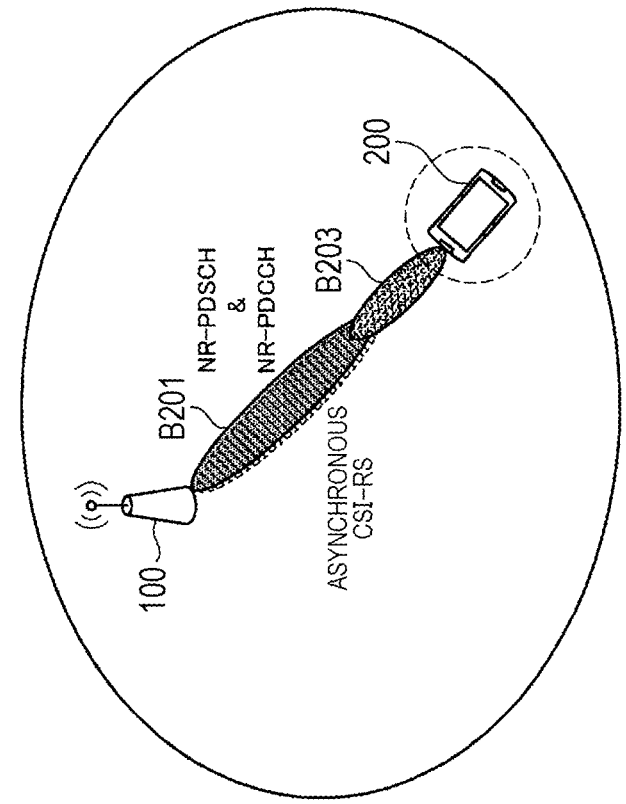

FIG. 20
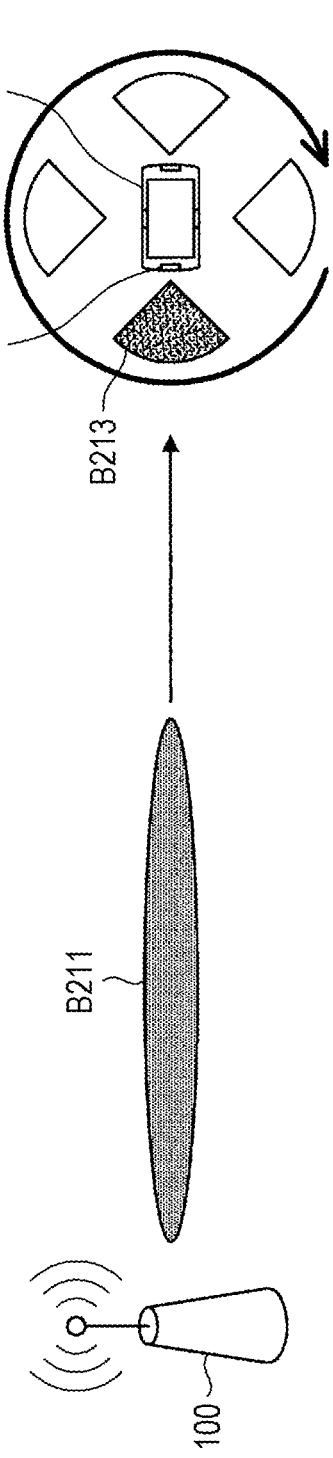
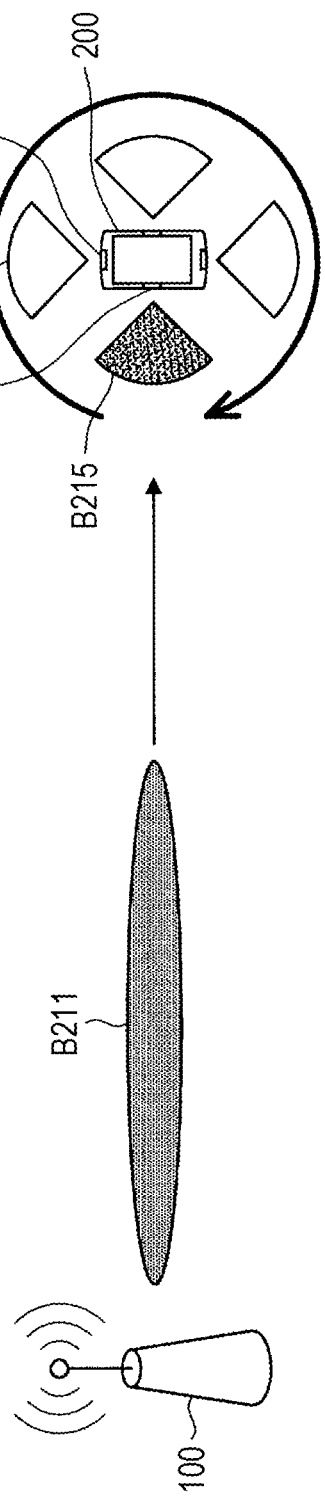
STATE BEFORE UE ROTATES
STATE AFTER UE HAS ROTATED FIG. 21
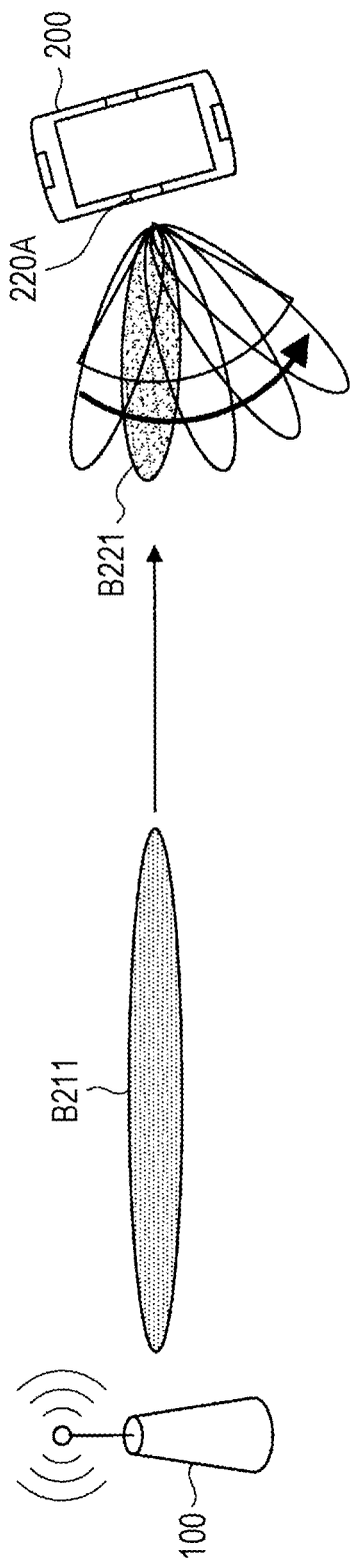
STATE BEFORE UE ROTATES
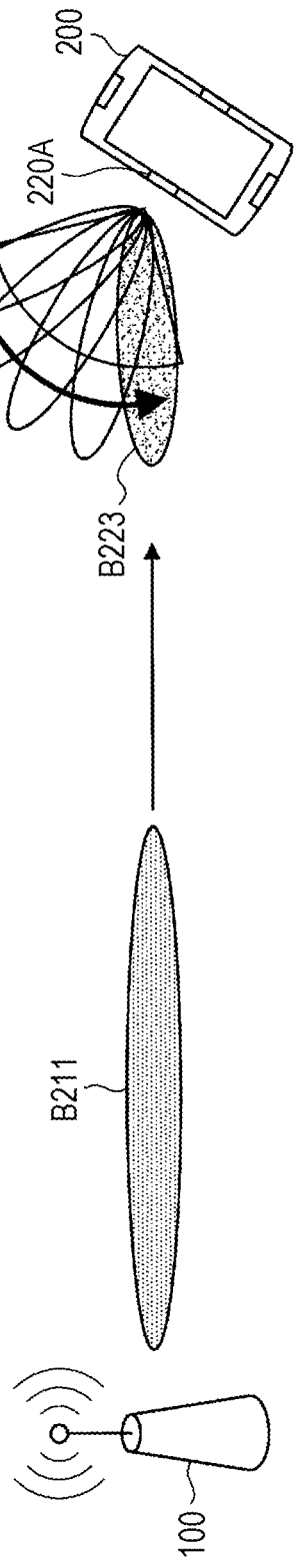
STATE AFTER UE HAS ROTATED FIG. 22
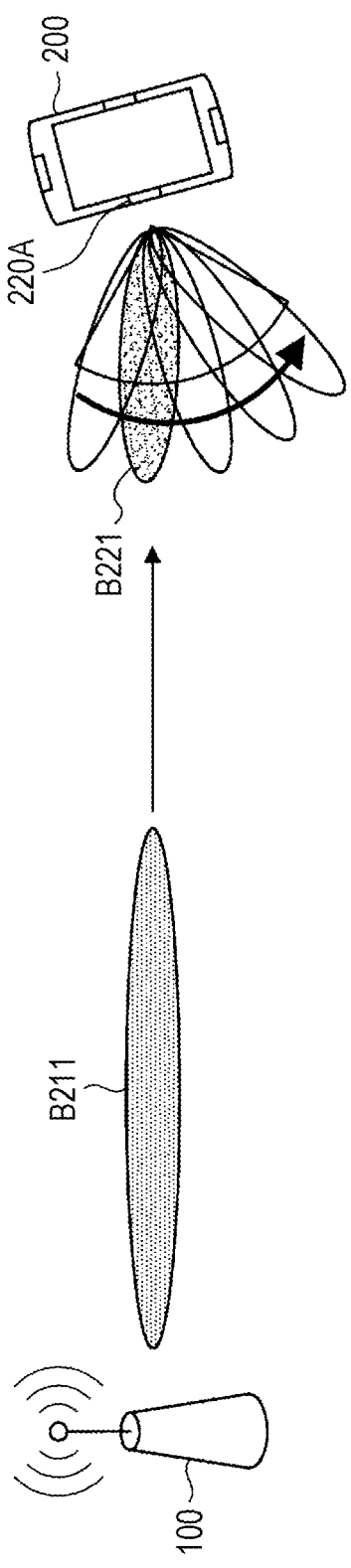
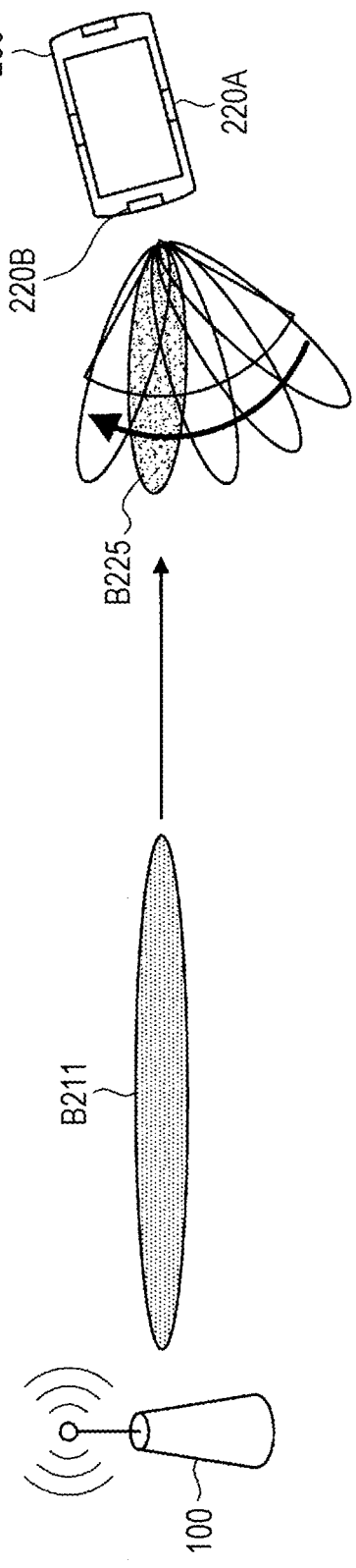

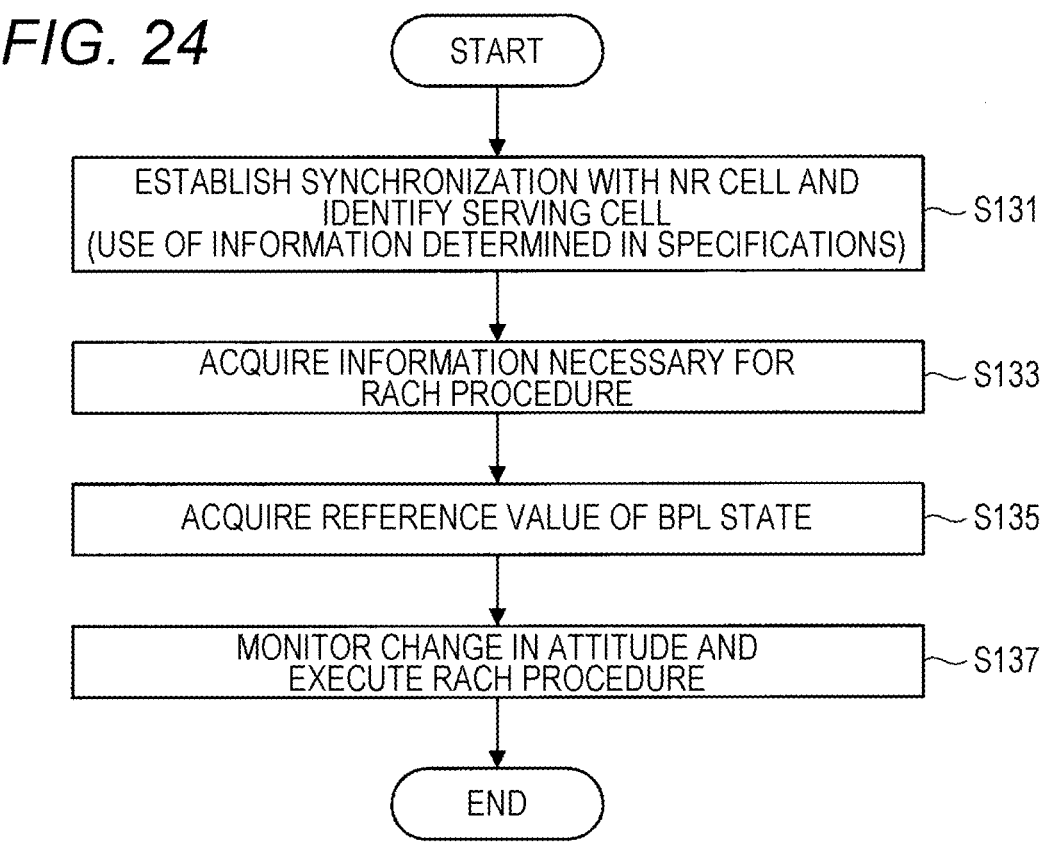
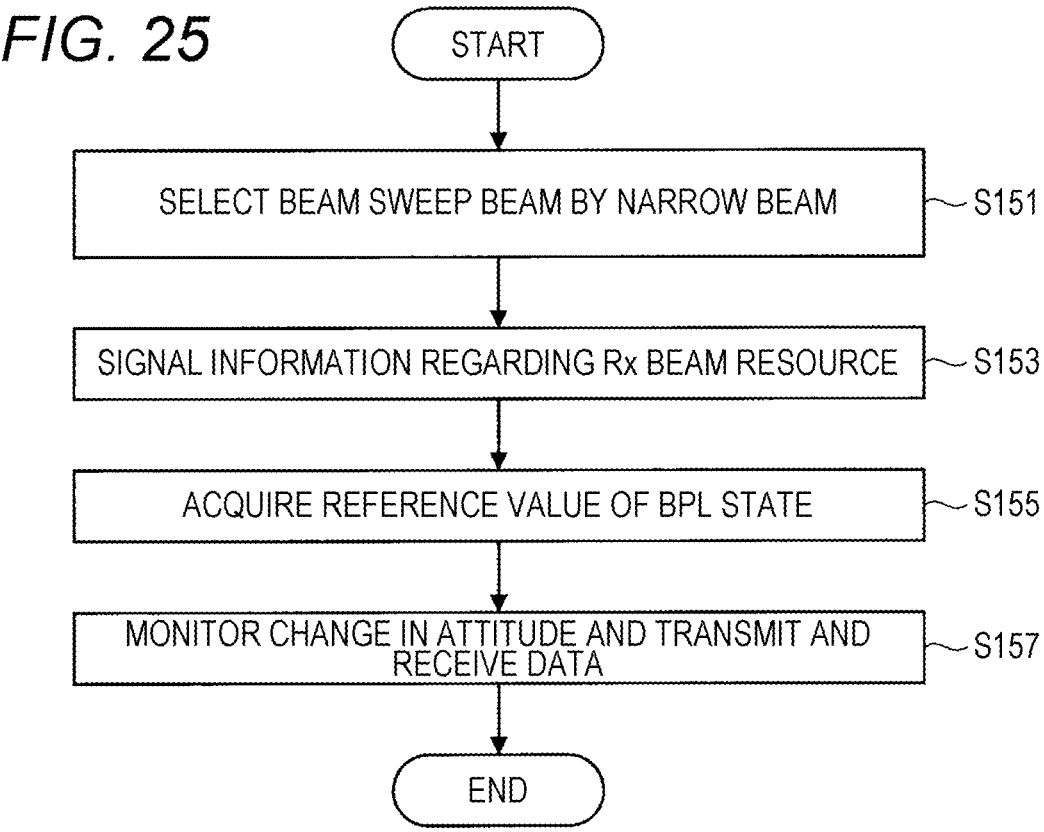

WIRELESS COMMUNICATION DEVICE, CONTROL DEVICE, AND CONTROL METHOD

CROSS-REFERENCE TO RELATED APPLICATIONS

The present application is based on PCT filing PCT/JP2018/015989, filed Apr. 18, 2018, which claims priority to U.S. 62/608,955, filed Dec. 21, 2017, the entire contents of each are incorporated herein by reference.

TECHNICAL FIELD

The present disclosure relates to a wireless communication device, a control device, and a control method.

BACKGROUND ART

In a mobile communication system based on a communication standard called long term evolution (LTE)/LTE-Advanced (LTE-A), a radio signal having a frequency called an ultrahigh frequency of about 700 MHz to 3.5 GHz is mainly used for communication.

Furthermore, in communication using the ultrahigh frequency as in the communication standard described above, by adopting a so-called multiple-input and multiple-output (MIMO) technology, it becomes possible to further improve communication performance by using a reflected wave in addition to a direct wave to transmit and receive a signal even in a fading environment. Since a plurality of antennas is used in MIMO, various methods of arranging the plurality of antennas in a more suitable manner for mobile communication terminal devices such as smartphones and the like have also been studied.

Furthermore, in recent years, various studies have been conducted on a fifth generation (5G) mobile communication system following the LTE/LTE-A. For example, in the 5G mobile communication system, it has been studied to use communication using a radio signal (hereinafter also simply referred to as a "millimeter wave") having a frequency called a millimeter wave such as 28 GHz or 39 GHz. Generally, the millimeter wave has a relatively large spatial attenuation, such that in a case where the millimeter wave is used for communication, there is a tendency for an antenna having a high gain to be required. In order to realize such a request, it has been studied to use a directional beam for communication between a base station and a terminal device by forming the directional beam by a so-called beam forming technology. For example, Non-Patent Document 1 discloses, particularly, a content of a study on use of the beamforming technology as a study on the communication using the millimeter wave in the 5G mobile communication system.

CITATION LIST

Non-Patent Document

Non-Patent Document 1: Satoshi Suyama et al., "5G Multi-antenna Technology", NTT DOCOMO Technical Journal, Vol. 23, No. 4, 2016, p 30-39

SUMMARY OF THE INVENTION

Problems to be Solved by the Invention

Meanwhile, in a case where the directional beam is formed by the beam forming technology, a beam width is limited, and communication via beams different from each other is thus spatially separated. Therefore, in a case where the directional beam directed from the terminal device toward the base station is directed in a direction different from the base station according to a change in an orientation of the terminal device, communication between the terminal device and the base station is restricted, and furthermore, a case where the communication is disconnected can be assumed.

Therefore, the present disclosure proposes a technology capable of realizing wireless communication using a directional beam in a more suitable manner.

Solutions to Problems

According to the present disclosure, there is provided a wireless communication device including: one or more antenna elements that are configured to control directions of directional beams and perform wireless communication using the directional beams; a detection unit that detects an orientation of at least any one of the one or more antenna elements; and a control unit that sets a state in which a radio signal transmitted using at least a directional beam from a base station is receivable via any one of the one or more antenna elements as a reference state, and controls the wireless communication with the base station using the directional beam according to a change in the orientation from the reference state.

Furthermore, according to the present disclosure, there is provided a control device including: an acquisition unit that acquires a detection result of an orientation of at least any one of one or more antenna elements configured to control directions of directional beams and performing wireless communication using the directional beams; and a control unit that sets a state in which a radio signal transmitted using at least a directional beam from a base station is receivable as a reference state, and controls the wireless communication with the base station using the directional beam according to a change in the orientation from the reference state.

Furthermore, according to the present disclosure, there is provided a control method, by a computer, including: acquiring a detection result of an orientation of at least any one of one or more antenna elements configured to control directions of directional beams and performing wireless communication using the directional beams; and setting a state in which a radio signal transmitted using at least a directional beam from a base station is receivable as a reference state and controlling the wireless communication with the base station using the directional beam according to a change in the orientation from the reference state.

Effects of the Invention

As described above, according to the present disclosure, a technology capable of realizing wireless communication using a directional beam in a more suitable manner is provided.

Note that the effect described above is not necessarily restrictive, and any effect set forth in the present specification or other effects that can be grasped from the present specification may be accomplished together with or instead of the effect described above.

BRIEF DESCRIPTION OF DRAWINGS

FIG. 15 is an explanatory diagram for describing an overview of a beam management procedure.

FIG. 19 is an explanatory diagram for describing another example of a case where a beam direction of a BPL changes.

FIG. 20 is an explanatory diagram for describing a basic principle of a technology according to the present disclosure.

FIG. 21 is an explanatory diagram for describing a basic principle of a technology according to the present disclosure.

FIG. 22 is an explanatory diagram for describing a basic principle of a technology according to the present disclosure.

FIG. 24 is a flowchart illustrating another example of a flow of processing related to control of communication with the base station by the terminal device according to the embodiment.

FIG. 25 is a flowchart illustrating an example of a flow of processing related to control of communication with the base station by the terminal device according to the embodiment.

MODE FOR CARRYING OUT THE INVENTION

Figure 1:
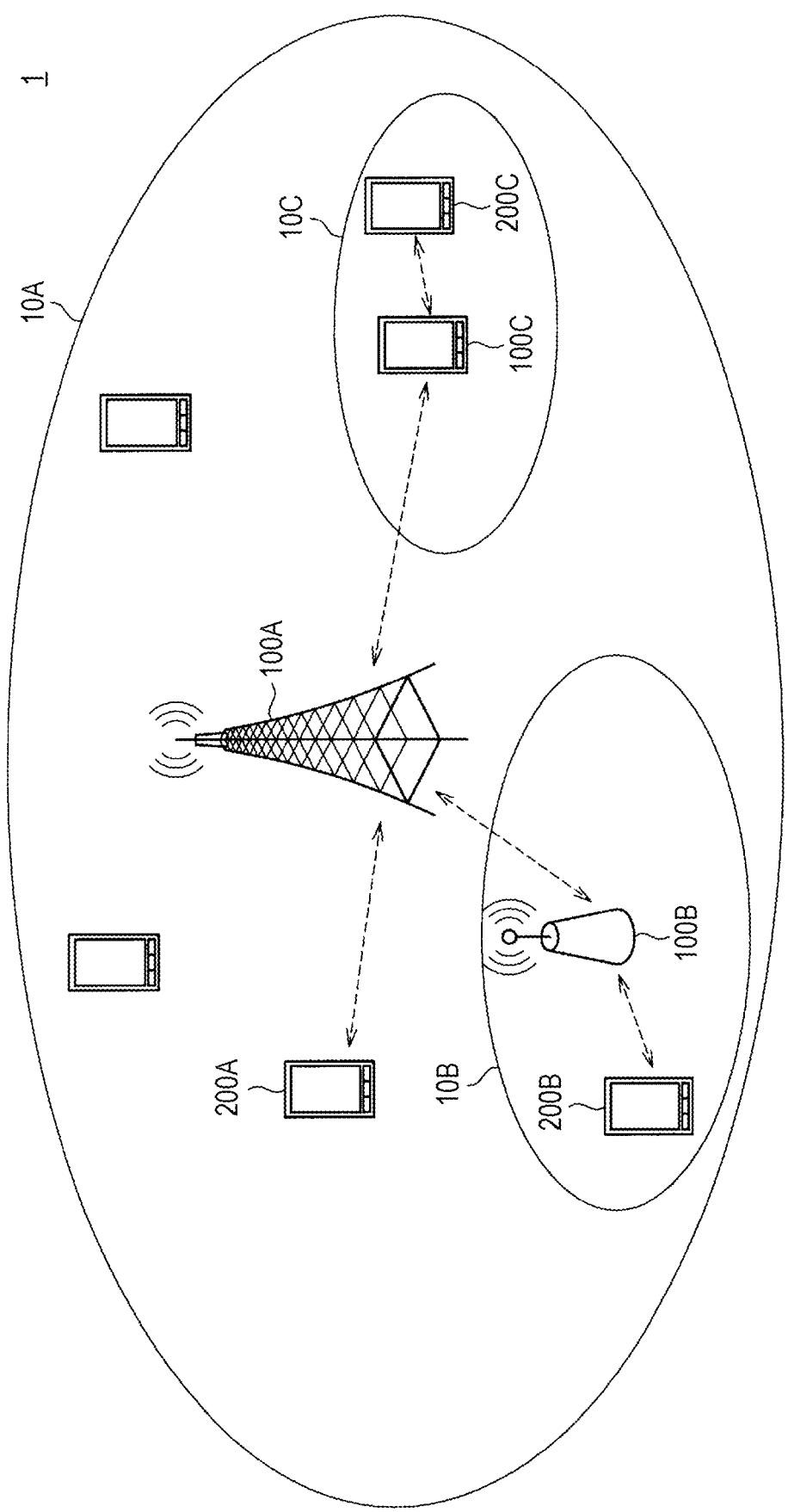
FIG. 1 is an explanatory diagram for describing an example of a schematic configuration of a system 1 according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals and an overlapping description will be omitted.

Note that a description will be given in the following order.

1. Configuration example
1.1. Example of system configuration
1.2. Configuration example of base station
1.3. Configuration example of terminal device
2. Overview of communication assuming use of millimeter wave
3. Technical problem
4. Technical feature
4.1. Basic principle
4.2. Processing
4.3. Modification
5. Hardware configuration
6. Application example
6.1. Application example 1: application example to another communication device
6.2. Application example 2: application example to communication based on another communication standard
7. End 1. Configuration Example 1.1. Example of System Configuration First, an example of a schematic configuration of a system 1 according to an embodiment of the present disclosure will be described with reference to FIG. 1. FIG. 1 is an explanatory diagram for describing an example of a schematic configuration of a system 1 according to an embodiment of the present disclosure. As illustrated in FIG. 1, the system 1 includes a wireless communication device 100 and a terminal device 200. Here, the terminal device 200 is also called a user. The user can also be called a user equipment (UE). A wireless communication device 100C is also called a UE-Relay. The UE here may be a UE defined in long term evolution (LTE) or LTE-Advanced (LTE-A), and the UE-Relay may be a prose UE to network relay discussed in $3^{rd}$ generation partnership project (3GPP) and may more generally mean a communication device.

(1) Wireless Communication Device 100

The wireless communication device 100 is a device that provides a wireless communication service to subordinate devices. For example, a wireless communication device 100A is a base station of a cellular system (or a mobile communication system). The base station 100A performs wireless communication with a device (for example, a terminal device 200A) located inside a cell 10A of the base station 100A. For example, the base station 100A transmits a downlink signal to the terminal device 200A and receives an uplink signal from the terminal device 200A.

The base station 100A is logically connected to another base station by, for example, an X2 interface, and can transmit and receive control information and the like to and from another base station. Furthermore, the base station 100A is logically connected to a so-called core network (not illustrated) by, for example, an S1 interface, and can transmit and receive control information and the like to and from the core network. Note that communication between these devices can be physically relayed by various devices.

Here, the wireless communication device 100A illustrated in FIG. 1 is a macro cell base station, and the cell 10A is a macro cell. On the other hand, wireless communication devices 100B and 100C are master devices that operate the small cells 10B and 10C, respectively. As an example, the master device 100B is a small cell base station that is fixedly installed. The small cell base station 100B establishes a radio backhaul link with the macro cell base station 100A and an access link with one or more terminal devices (for example, a terminal device 200B) in the small cell 10B. Note that the wireless communication device 100B may be a relay node defined in 3GPP. The master device 100C is a dynamic access point (AP). The dynamic AP 100C is a mobile device that dynamically operates the small cell 10C. The dynamic AP 100C establishes a radio backhaul link with the macro cell base station 100A and an access link with one or more terminal devices (for example, a terminal device 200C) in the small cell 10C. The dynamic AP 100C may be, for example, a terminal device mounted with hardware or software that can operate as a base station or a wireless access point. The small cell 10C in this case is a dynamically formed local network (localized network/virtual cell).

The cell 10A may be operated according to any wireless communication manner such as, for example, LTE, LTE-A, LTE-Advanced Pro, global system for mobile communications (GSM) (registered trademark), universal mobile telecommunication system (UMTS), wideband code division multiple access (W-CDMA), CDMA2000, world interoperability for microwave access (WiMAX), WiMAX2, IEEE 802.16, or the like.

Note that the small cell is a concept that can include various types of cells (for example, a femto cell, a nano cell, a pico cell, a micro cell, and the like) that are arranged to overlap or not to overlap with the macro cell and are smaller than the macro cell. In a certain example, the small cell is operated by a dedicated base station. In another example, the small cell is operated by causing a terminal that becomes a master device to temporarily operate as a small cell base station. A so-called relay node can also be considered as a form of a small cell base station. A wireless communication device that functions as a master station of the relay node is also referred to as a donor base station. The donor base station may mean a DeNB in the LTE, and more generally, may mean a master station of the relay node.

(2) Terminal Device 200

The terminal device 200 can perform communication in the cellular system (or the mobile communication system). The terminal device 200 performs wireless communication with the wireless communication device (for example, the base station 100A or the master device 100B or 100C) of the cellular system. For example, the terminal device 200A receives a downlink signal from the base station 100A and transmits an uplink signal to the base station 100A.

Furthermore, the terminal device 200 is not limited to only a so-called UE, and may be, for example, a so-called low cost UE such as a machine type communication (MTC) terminal, an enhanced MTC (eMTC) terminal, and a narrow band-Internet of things (NB-IoT) terminal, and the like.

(3) Supplement

The schematic configuration of the system 1 has been described hereinabove, but the present technology is not limited to the example illustrated in FIG. 1. For example, a configuration that does not include the master device, a small cell enhancement (SCE), a heterogeneous network (HetNet), an MTC network, and the like, can be adopted as the configuration of the system 1. Furthermore, as another example of the configuration of the system 1, the master device may be connected to the small cell to construct a cell under the small cell.

1.2. Configuration Example of Base Station

Figure 2:
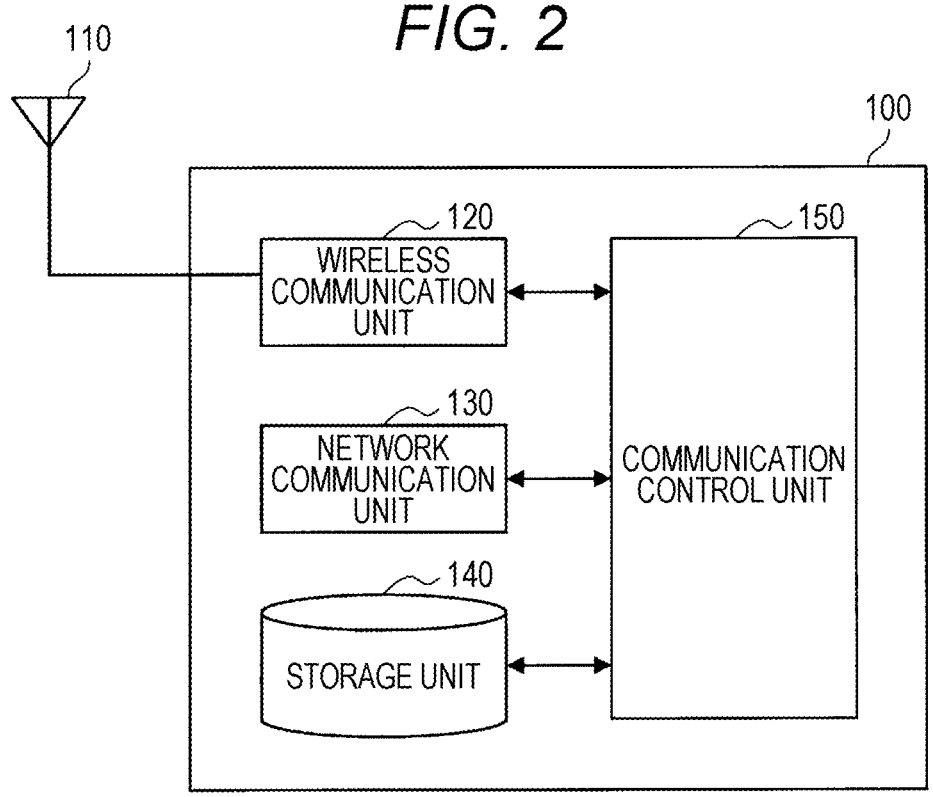
FIG. 2 is a block diagram illustrating an example of a configuration of a base station according to the embodiment.

Next, a configuration of the base station 100 according to the embodiment of the present disclosure will be described with reference to FIG. 2. FIG. 2 is a block diagram illustrating an example of a configuration of the base station 100 according to the embodiment of the present disclosure. Referring to FIG. 2, the base station 100 includes an antenna unit 110, a wireless communication unit 120, a network communication unit 130, a storage unit 140, and a communication control unit 150.

(1) Antenna Unit 110

The antenna unit 110 radiates a signal output from the wireless communication unit 120 into a space as a radio wave. Furthermore, the antenna unit 110 converts a radio wave in the space into a signal and outputs the signal to the wireless communication unit 120.

(2) Wireless Communication Unit 120

The wireless communication unit 120 transmits and receives a signal. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from another node. For example, another node described above includes another base station and core network node.

Note that, as described above, in the system 1 according to the present embodiment, the terminal device may operate as a relay terminal to relay communication between a remote terminal and the base station. In such a case, for example, the wireless communication device 100C corresponding to the relay terminal may not include the network communication unit 130.

(4) Storage Unit 140

The storage unit 140 temporarily or permanently stores a program for operating the base station 100 and various data.

(5) Communication Control Unit 150

The communication control unit 150 controls communication with another device (for example, the terminal device 200) via a wireless communication path by controlling an operation of the wireless communication unit 120. As a specific example, the communication control unit 150 may generate a transmission signal by modulating data, which is a transmission target, on the basis of a predetermined modulation manner, and cause the wireless communication unit 120 to transmit the transmission signal to the terminal device 200 in the cell. Furthermore, as another example, the communication control unit 150 may acquire a reception result (that is, a reception signal) of a signal from the terminal device 200 from the wireless communication unit 120, and demodulate the data transmitted from the terminal device 200 by performing predetermined demodulation processing on the reception signal.

Furthermore, the communication control unit 150 may control communication with another base station 100 or each entity configuring the core network by controlling an operation of the network communication unit 130.

Note that the configuration of the base station 100 described above with reference to FIG. 2 is merely an example, and a functional configuration of the base station 100 is not necessarily limited. As a specific example, some of each configuration of the base station 100 may be provided outside the base station 100. Furthermore, each function of the base station 100 may be realized by a plurality of devices operating in cooperation with each other.

1.3. Configuration Example of Terminal Device

Figure 3:
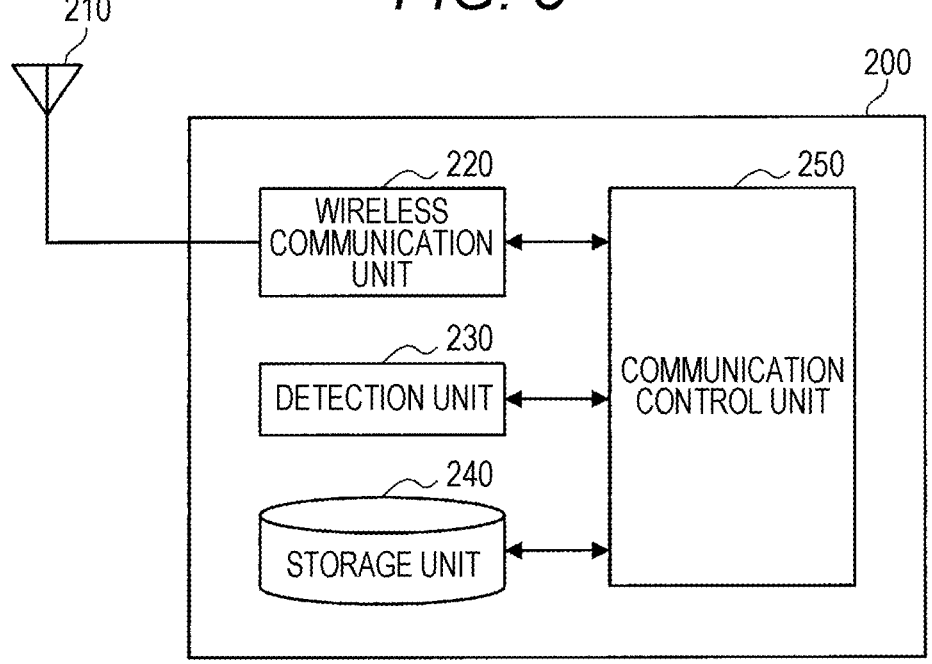
FIG. 3 is a block diagram illustrating an example of a configuration of a terminal device according to the embodiment.

Next, an example of a configuration of the terminal device 200 according to the embodiment of the present disclosure will be described with reference to FIG. 3. FIG. 3 is a block diagram illustrating an example of a configuration of the terminal device 200 according to the embodiment of the present disclosure. As illustrated in FIG. 3, the terminal device 200 includes an antenna unit 210, a wireless communication unit 220, a detection unit 230, a storage unit 240, and a communication control unit 250.

(1) Antenna Unit 210

The antenna unit 210 radiates a signal output from the wireless communication unit 220 into a space as a radio wave. Furthermore, the antenna unit 210 converts a radio wave in the space into a signal and outputs the signal to the wireless communication unit 220. Note that the antenna unit 210 may include a plurality of antenna elements. Therefore, in the following description, each antenna element is also referred to as an "antenna element 210".

(2) Wireless Communication Unit 220

The wireless communication unit 220 transmits and receives a signal. For example, the wireless communication unit 220 receives a downlink signal from the base station and transmits an uplink signal to the base station.

Furthermore, as described above, in the system 1 according to the present embodiment, the terminal device may operate as a relay terminal to relay communication between a remote terminal and the base station. In such a case, for example, the wireless communication unit 220 in the terminal device 200C operating as the remote terminal may transmit and receive a side link signal to and from the relay terminal.

(3) Detector 230

The detection unit 230 includes various sensors such as an acceleration sensor, a gyro sensor or the like, and detects a change in an orientation of the terminal device 200. The detection unit 230 may notify the communication control unit 250 of information according to a detection result of the change in the orientation of the terminal device 200.

(4) Storage Unit 240

The storage unit 240 temporarily or permanently stores a program for operating the terminal device 200 and various data.

(5) Communication Control Unit 250

The communication control unit 250 controls communication with another device (for example, the base station 100) via a wireless communication path by controlling an operation of the wireless communication unit 220. As a specific example, the communication control unit 250 may generate a transmission signal by modulating data, which is a transmission target, on the basis of a predetermined modulation manner, and cause the wireless communication unit 220 to transmit the transmission signal to the base station 100. Furthermore, as another example, the communication control unit 250 may acquire a reception result (that is, a reception signal) of a signal from the base station 100 from the wireless communication unit 220, and demodulate the data transmitted from the base station 100 by performing predetermined demodulation processing on the reception signal.

Note that the configuration of the terminal device 200 described above with reference to FIG. 3 is merely an example, and a functional configuration of the terminal device 200 is not necessarily limited. As a specific example, some of each configuration of the terminal device 200 may be provided outside the terminal device 200. As a more specific example, at least any one of the antenna unit 210, the wireless communication unit 220, the detection unit 230, and the storage unit 240 illustrated in FIG. 3 may be externally attached to the terminal device 200. Note that in this case, a device of a side including the communication control unit 250 corresponds to an example of a "control device". Furthermore, each function of the terminal device 200 may be realized by a plurality of devices operating in cooperation with each other.

2. Overview of Communication Assuming Use of Millimeter Wave

In recent years, various studies have been conducted on a fifth generation (5G) mobile communication system following LTE/LTE-A, and introduction of a radio access technology (RAT), which is also called new radio (NR) and is different from the LTE, as a next-generation radio access manner has also been studied.

Figure 4:
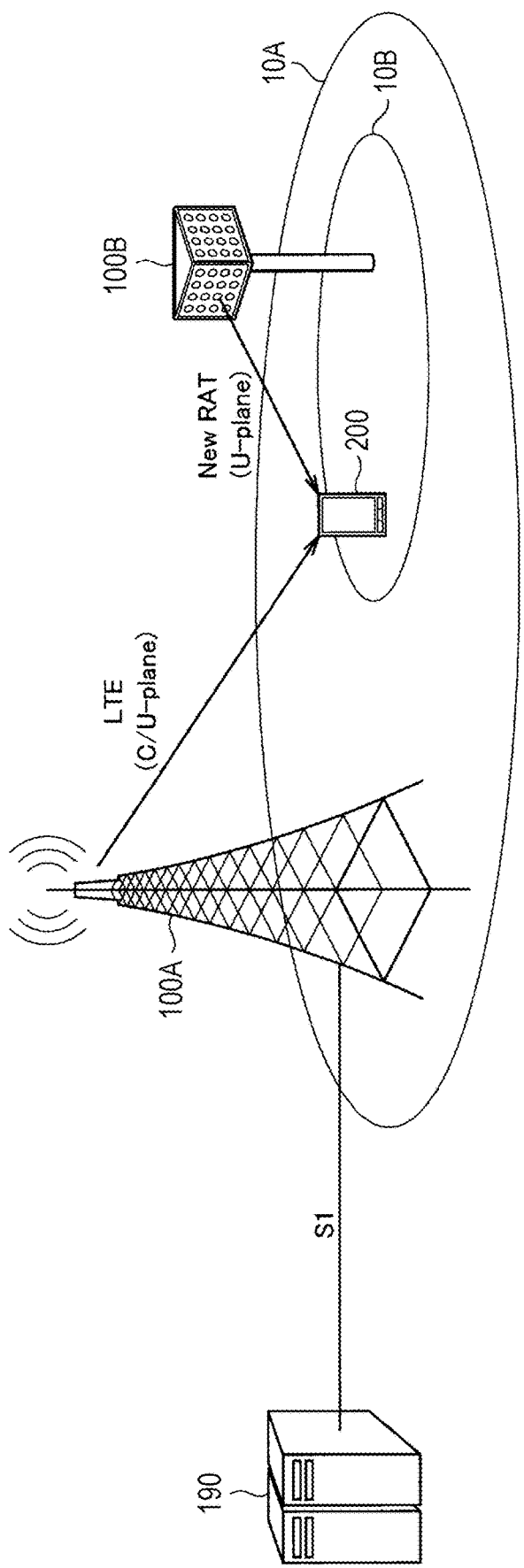
FIG. 4 is a diagram illustrating an example of a system configuration of a mobile communication system assumed in non-standalone (NSA).

Furthermore, with the introduction of the NR, a study on a standard called non-standalone (NSA) assuming use in combination with an existing LTE network has also been conducted. For example, FIG. 4 is a diagram illustrating an example of a system configuration of a mobile communication system assumed in NSA. As illustrated in FIG. 4, in the NSA, transmission and reception of C-plain (control information) are performed between a macro cell base station 100A and a terminal device 200 using existing LTE as an anchor. Furthermore, transmission and reception of U-plain (user data) are performed between a small cell base station 100B and the terminal device 200 by the NR. With such a configuration, it becomes possible to realize the transmission and the reception of the U-plain with higher throughput. Furthermore, a 5G radio access network (RAN) is controlled via an S1 interface by an evolved packet core (EPC) 190.

Particularly, in the 5G mobile communication system, it has been studied to use communication using a radio signal (hereinafter also simply referred to as a "millimeter wave") having a frequency called a millimeter wave such as 28 GHz or 39 GHz. Furthermore, the millimeter wave has a relatively large spatial attenuation, such that in a case where the millimeter wave is used for communication, there is a tendency for an antenna having a high gain to be required. In order to realize such a request, in the 5G mobile communication system, it has been studied to use a directional beam for communication between a base station and a terminal device by forming the directional beam by a so-called beam forming technology. By using such a technology, for example, the communication between the base station and the terminal device is time-multiplexed and frequency-multiplexed, but can also be spatially multiplexed. With such a configuration, in the 5G mobile communication system, it becomes possible to increase the number of users who can simultaneously perform End-to-End communication at a very high data rate, and a cell capacity is dramatically increased. Therefore, realization of enhanced mobile broadband (eMBB) of a service has been expected.

(Overview of Cell Layout Design)

Figure 5:
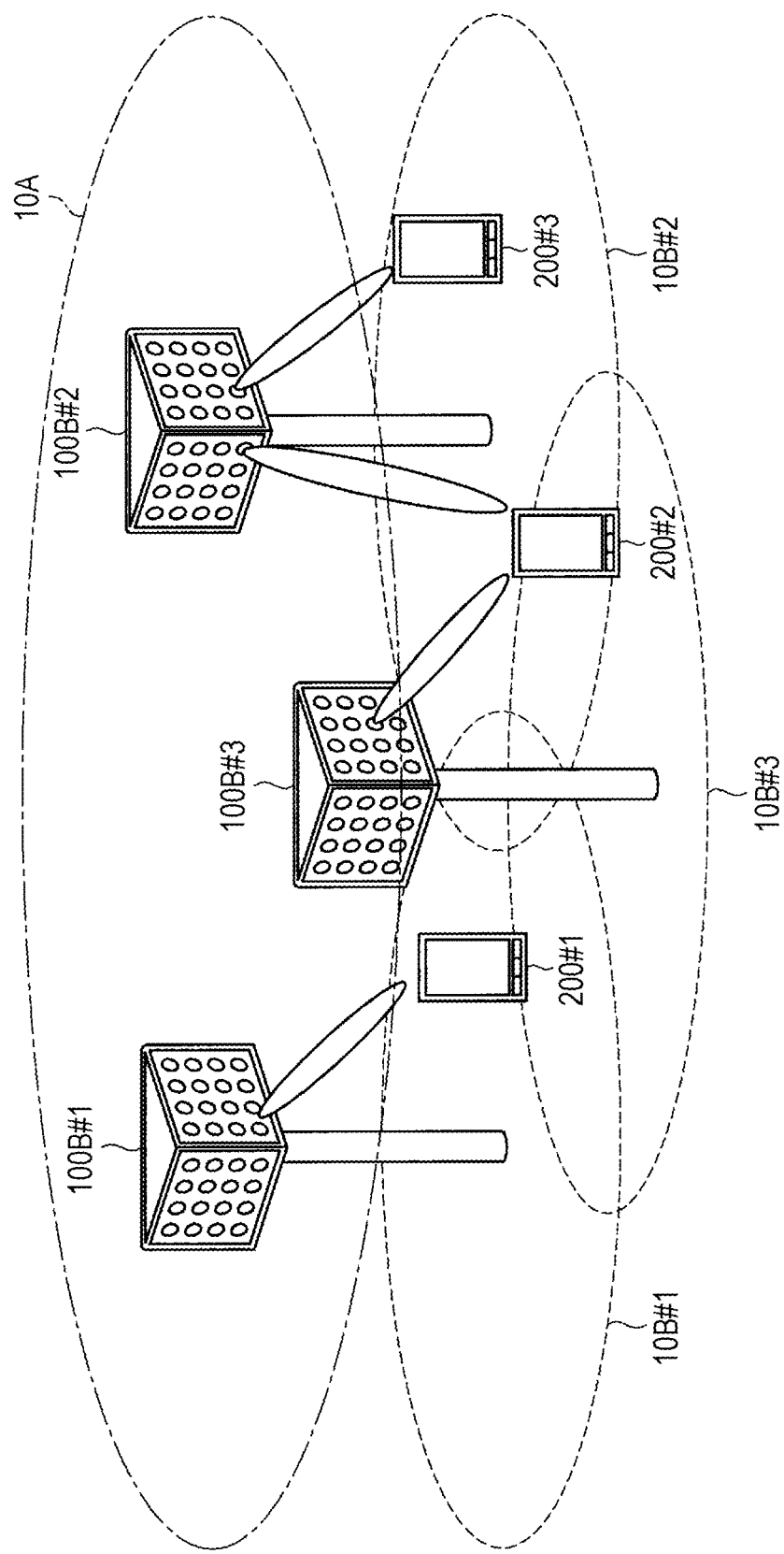
FIG. 5 is an explanatory diagram for describing an overview of an example of a cell layout design in fifth generation (5G).

Here, an overview of an example of a cell layout design in 5G will be described with reference to FIG. 5. FIG. 5 is an explanatory diagram for describing an overview of an example of a cell layout design in 5G. In the example illustrated in FIG. 5, an existing cell 10A based on an LTE standard is used as an overlaid cell, and small cells 10B #1 to 10B #3 capable of performing communication using millimeter waves overlap each other within the cell 10A to form a heterogeneous network (HetNet). Note that the small cells 10B #1 to 10B #3 refer to small cells formed by small cell base stations 100B #1 to 100B #3, respectively. On the basis of such a configuration, transmission and reception of U-plane (user data) are performed between each of the small cell base stations 100B #1 to 100B #3 and each of terminal devices 200 #1 to 200 #3 located in the small cells 10B #1 to 10B #3, respectively. Therefore, it becomes possible to further improve throughput related to the transmission and the reception of the U-plain (user data).

(Overview of Initial Access)

Next, an overview of an initial access (IA) procedure in 5G for which standardization specifications are being formulated will be described.

Figure 6:
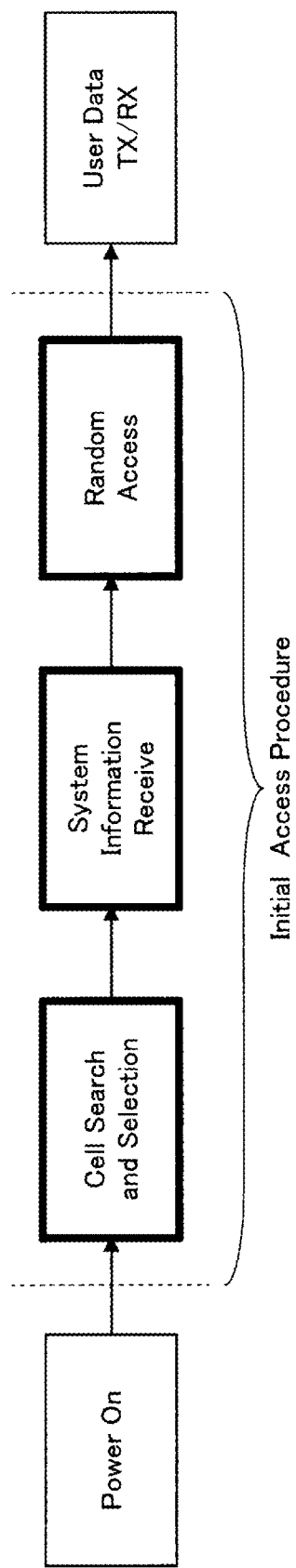
FIG. 6 is an explanatory diagram for describing an overview of an initial access procedure.

For example, FIG. 6 is an explanatory diagram for describing an overview of an initial access procedure. As illustrated in FIG. 6, when the terminal device 200 is activated in accordance with power-on and the like, the terminal device 200 establishes communication with the base station 100 by executing an initial access procedure, and thereafter performs transmission and reception of user data to and from the base station 100. Furthermore, in the initial access procedure, processing of cell search and selection, system information receiver, and random access is mainly executed in this order.

In 5G, for the purpose of reducing power consumption on a network side and compensating for path loss in a millimeter wave, a beam width is narrowed using a beamforming technology, and a beam sweep of a downlink (DL) signal is then performed in the cell. From such a characteristic, in 5G, as in LTE, a primary synchronization signal (PSS), a secondary synchronization signal (SSS), and a physical broadcast channel (PBCH) for performing cell search and cell selection and a cell-specific reference signal (CRS) used for a channel estimate (CE) are not transmitted always-on manner from a base station (eNB) side in each cell.

Figure 7:
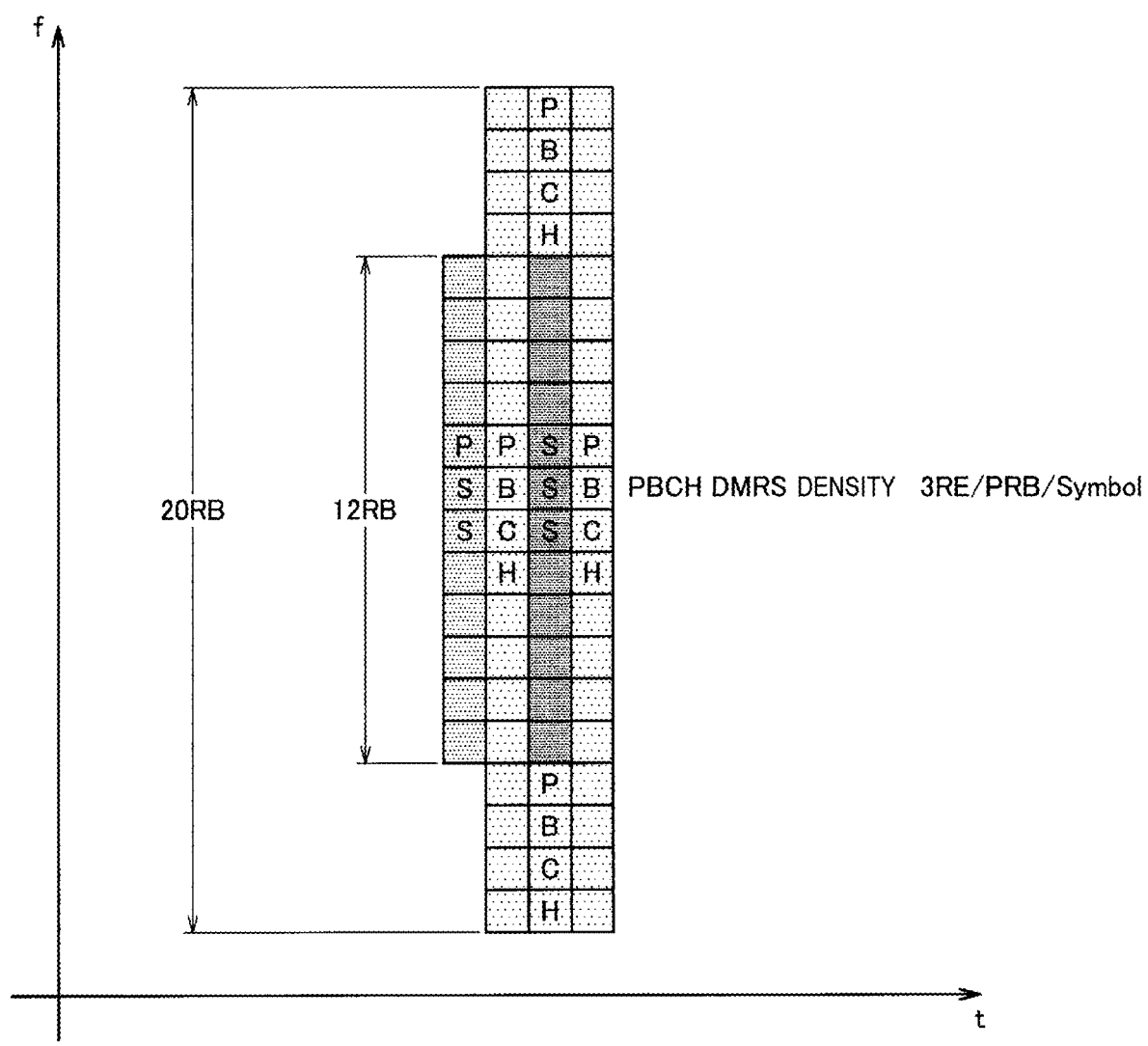
FIG. 7 is a diagram illustrating an example of a schematic structure of an SS block.

In 5G, the PSS, the SSS, and the PBCH are organized and transmitted in an OFDM4 symbol as an SS block. For example, FIG. 7 is a diagram illustrating an example of a schematic structure of an SS block.

Figure 8:
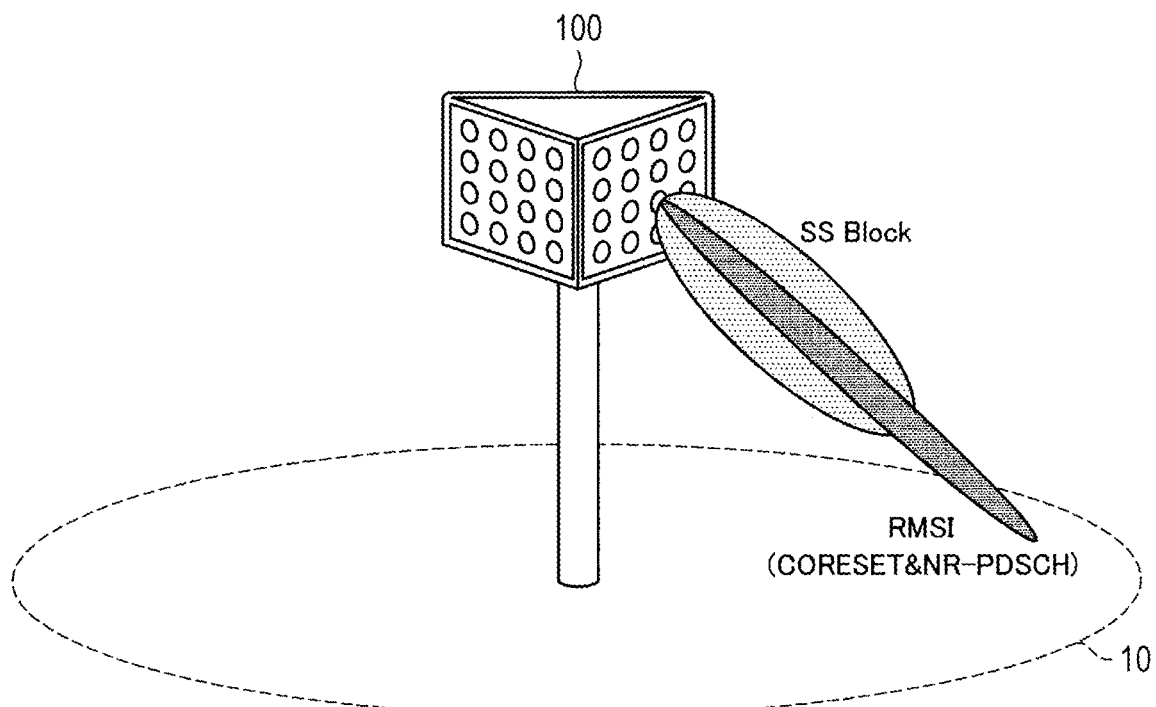
FIG. 8 is an explanatory diagram for describing an overview of notification of a new radio-master information block (NR-MIB) to a terminal device in a cell by a base station.

Furthermore, within one cell, various information is provided in notification to a terminal device side as a new radio-master information block (NR-MIB) on payload data of a PBCH of one SS block. For example, FIG. 8 is an explanatory diagram for describing an overview of notification of an NR-MIB to a terminal device in a cell by a base station. Examples of the information provided in notification as the NR-MIB can include the minimum required system frame number (SFN) in an initial access procedure, an SS burst set cycle that is a cycle in which a set of SS blocks is transmitted, scheduling information of remaining minimum system information (RMSI) carrying the remaining system information NR-SIB1, and the like, similarly to LTE. Furthermore, it has been agreed in a process of standardization that the SS block and the RMSI can be assumed to be (spatially) quasi co-located (QCL).

Note that the QCL corresponds to a case where long-term propagation path characteristics are the same between different antenna ports (APs). The long-term propagation path characteristics refer to delay spread, Doppler spread, a Doppler shift, an average gain, an average delay, and the like, and a case in which some or all of the Doppler spread, the Doppler shift, the average gain, the average delay, and the like, are the same as each other is assumed to be the QCL. The QCL corresponds to a case where quasi geographical relationships are the same as each other, but is not necessarily limited to a case where they are physically close to each other. Furthermore, a definition of the QCL up to 4G has been described above, but in a definition of the QCL in 5G, an angle domain characteristic indicating a spatial beam direction is further added, in addition to a characteristic of the QCL described above defined in Rel-11 of LTE-A. The angle domain characteristic indicating the beam direction is defined as QCLtypes D: Spatial Rx in a standardized specification, and the meaning that beams can be assumed to be (spatially) quasi co-located (QCL) is that beams can be received from the same spatial direction.

Meanwhile, a payload size of an NR-PBCH in the SS block is limited to a small bit capacity that is larger than 40 bits and does not exceed 72 bits. Therefore, it is necessary to receive the RMSI carrying the NR-SIB1, which is the remaining system information necessary for performing the initial access procedure, in 5G, similarly to LTE.

Currently, the RMSI is under discussion in 3GPP, but at present, it has been almost agreed that RMSI linked with one SS block in one cell has only one-to-one association. Note that in a case of a wideband operation, it has been agreed that multiple SS blocks can be transmitted in multiple bandwidth parts (BWPs), but in that case, it has been determined that a many-to-one support with RMSI linked with the SS blocks depends on a support on a network side.

The RMSI basically includes a new radio-physical downlink shared channel (NR-PDSCH) carrying message data and a control resource set (CORESET) carrying resource information for the RMSI. Information regarding the CORESET carrying the resource information for the RMSI is provided in notification to a terminal device side by the NR-MIB on the payload data of the NR-PBCH. Furthermore, the CORESET is configured by a new radio-physical downlink control channel (NR-PDCCH) through which the terminal device side is to perform monitoring, and is set to either a common search space (CSS) or a UE-specific search space (USS).

Furthermore, in 5G, it has agreed in 3GPP that setting information of random access (RA) in the initial access procedure is included in the RMSI. Furthermore, it has been agreed that a 4-step RACH procedure is adopted as the initial access procedure, similarly to LTE. That is, threshold information of an SS block to be selected in a case where a terminal device (UE) side transmits Msg1 (physical random access channel (PRACH) preamble) and Tx transmission power information on a base station (gNB) side are transmitted by the RMSI. A path loss (PL) estimate by reference signal received power (RSRP) measurement or selection an optimal SS block in a serving cell in Msg1 transmission or an RACH resource corresponding to the SS block can be performed on the basis of the SS block that satisfies this threshold.

Figure 9:
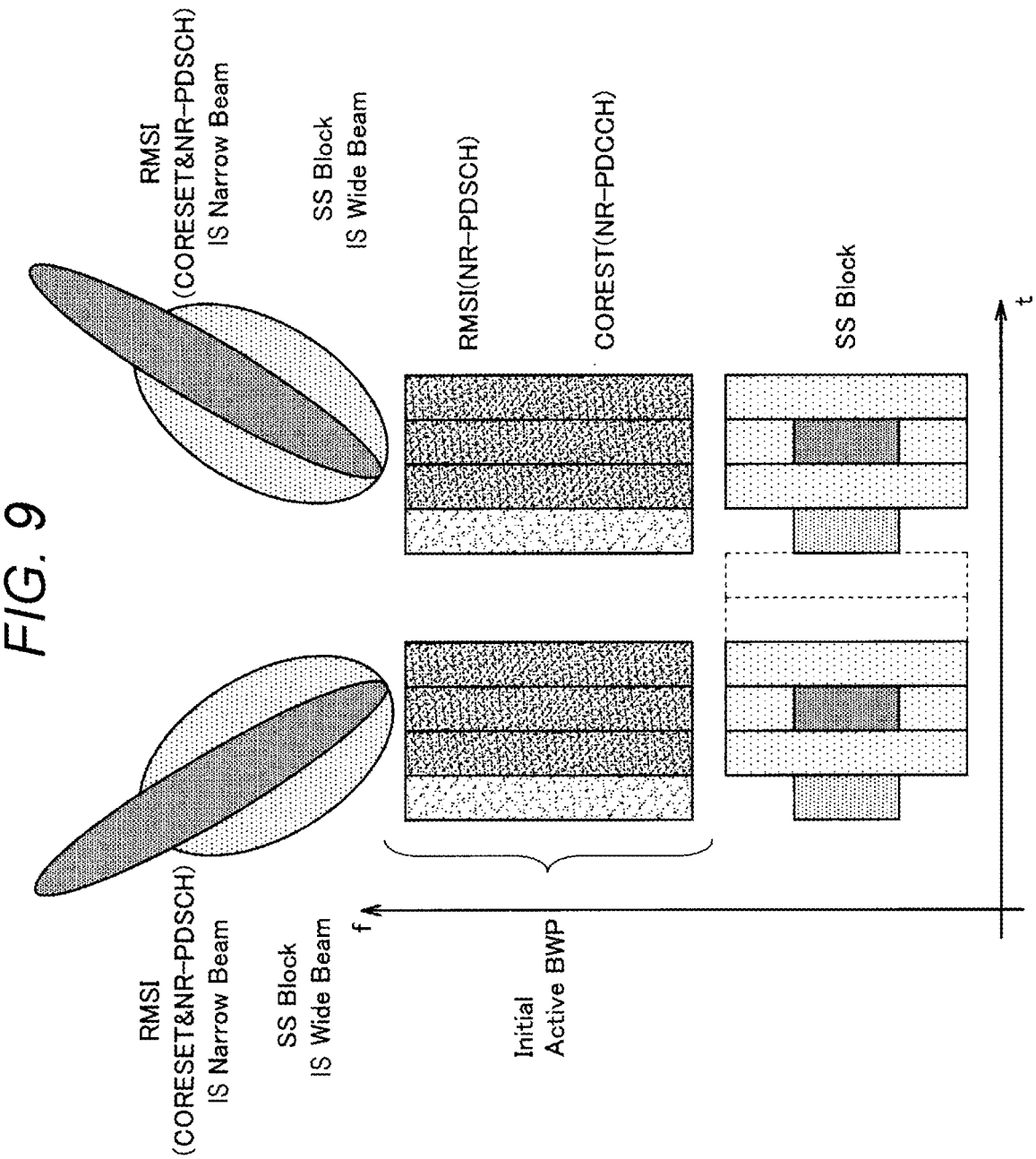
FIG. 9 is a diagram schematically illustrating quasi co-location (QCL) of an SS block and remaining minimum system information (RMSI).

Furthermore, as described above, the COREST and the RMSI linked with one SS block in the serving cell are frequency-division multiplexed (FDM) and (spatially) quasi co-located (QCL). For example, FIG. 9 is a diagram schematically illustrating quasi co-location (QCL) of an SS block and RMSI.

The terminal device side can simultaneously receive the frequency-division multiplexed COREST and RMSI by receiving the SS block transmitted using a wide beam from the base station side using a wide beam. Therefore, the terminal device side can select the optimal SS block in the Msg1 transmission, as described above, or derive an initial value of uplink (UL) power control of an open loop obtained from the path loss estimate. Furthermore, the terminal device side can also simultaneously know subcarrier spacing (SCS) information of a PRACH or information regarding a step size of power ramping in the PRACH.

(4-Step RACH Procedure)

Figure 10:
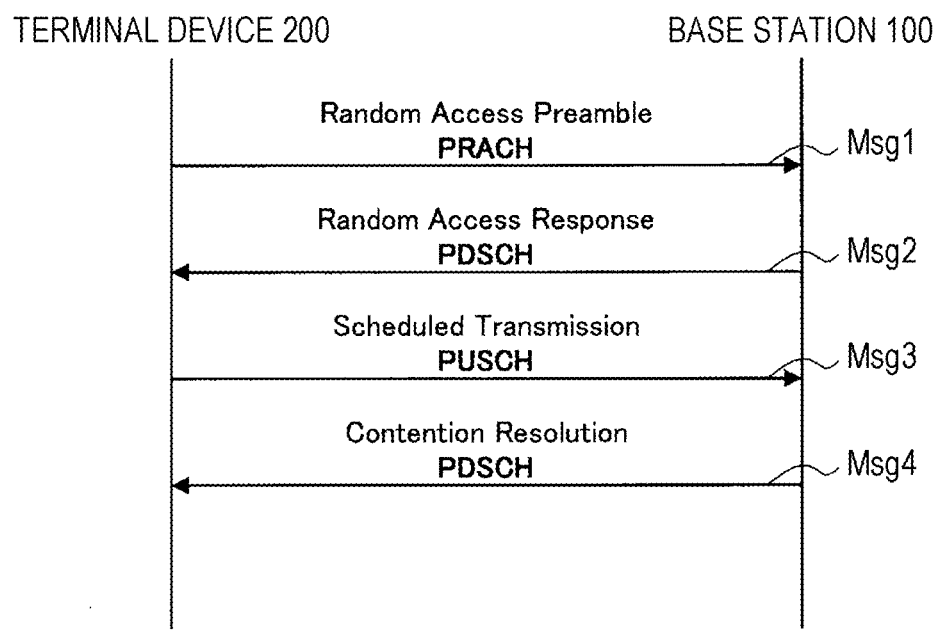
FIG. 10 is a schematic sequence diagram illustrating a flow of a 4-step random access channel (RACH) procedure.

Next, a flow of 4-step RACH procedure will be described focusing on a characteristic portion in a case where the 4-step RACH procedure is applied in 5G. For example, FIG. 10 is a schematic sequence diagram illustrating a flow of 4-step RACH procedure. Furthermore, FIG. 11 is an explanatory diagram for describing an overview of the 4-step RACH procedure, and illustrates a flow of information between the base station and the terminal device in each procedure.

Figure 11:
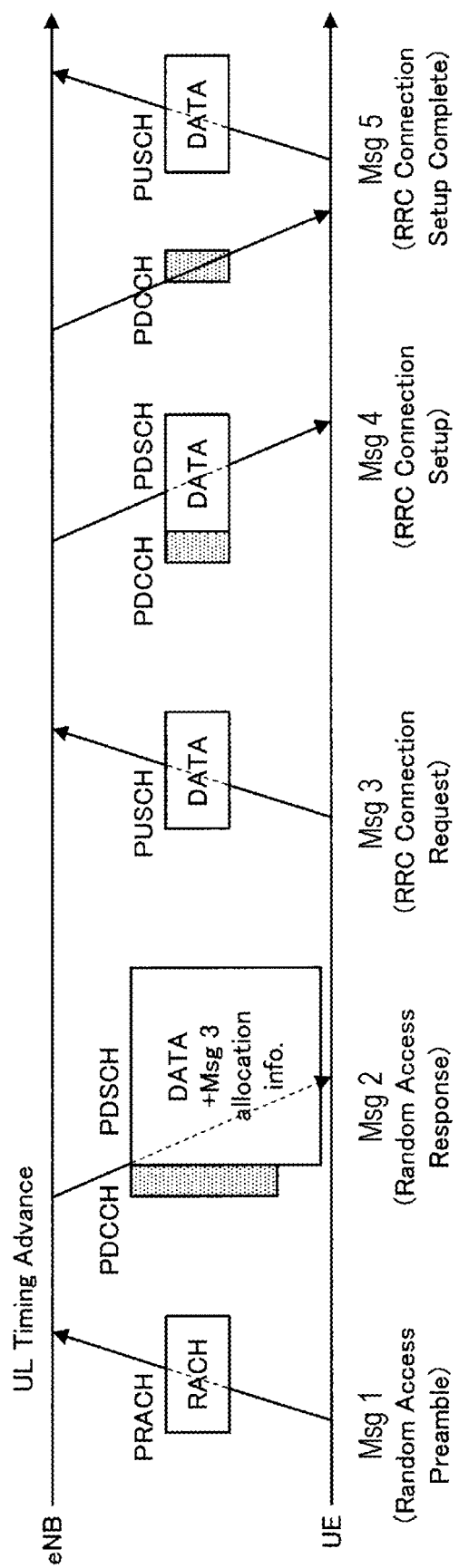
FIG. 11 is an explanatory diagram for describing an overview of the 4-step RACH procedure.

As illustrated in FIGS. 10 and 11, in the 4-step RACH procedure, the terminal device sequentially executes the following four procedures.

Msg1 (PRACH preamble) transmission
Msg2 (random access response (RAR)) reception
Msg3 (radio resource control (RRC) connection request) transmission
Msg4 (RRC connection setup) reception Furthermore, the terminal device may transmit Msg5 (RRC connection setup complete) indicating completion of the initial access procedure to the base station after reception of the Msg4, in addition to the four procedures described above.

In general, it is desirable for the terminal device side to complete the initial access procedure as soon as possible and shift to a CONNECTED mode. In particular, in 5G, as described above, beamforming is performed to compensate for the path loss due to the use of the millimeter wave. In such a situation, it becomes important for the terminal device side to end the initial access procedure performed using the wide beam as soon as possible and shift to the CONNECTED mode, in order to stably maintain a beam pear link (BPL) state by beam synchronization. From such a background, in 5G, a mechanism of making the delay due to the beam sweep for establishing the BPL by using the assumption of the (spatial) QCL described above as small as possible has been studied.

In a case where it is assumed that the terminal device side has 2 to 4 antenna arrays/subsets related to UE capability, information for performing the initial access procedure (4-step RACH) has already been obtained. This is due to the fact that the terminal device side can simultaneously receive the frequency-division multiplexed (FDM) COREST and RMSI by receiving the SS block transmitted using the wide beam from the base station (gNB) side, as described above, using a wide beam that is quasi-omni on each antenna array/subset.

Next, each procedure of a 4-step RACH will be described below focusing on handling in 5G.

(1) Msg1 (PRACH Preamble) Transmission

Figure 12:
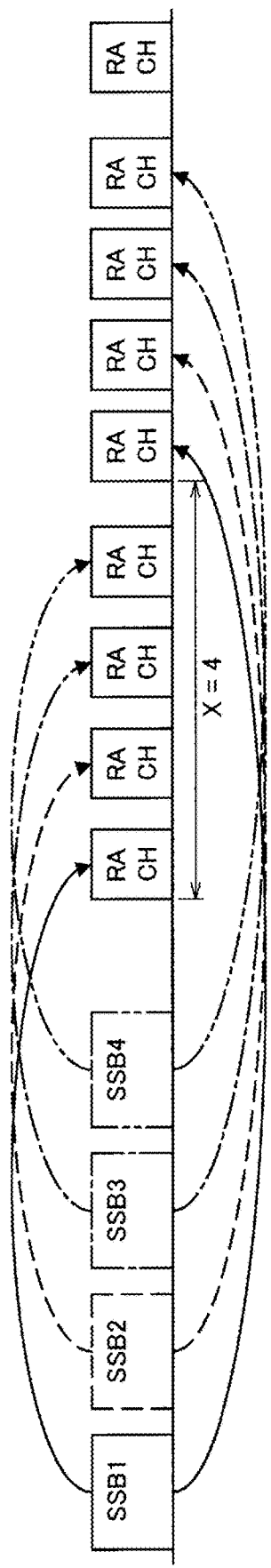
FIG. 12 is a diagram illustrating an overview of an idea of mapping from an SS block to an RACH transmission occasion (RO).
Figure 13:
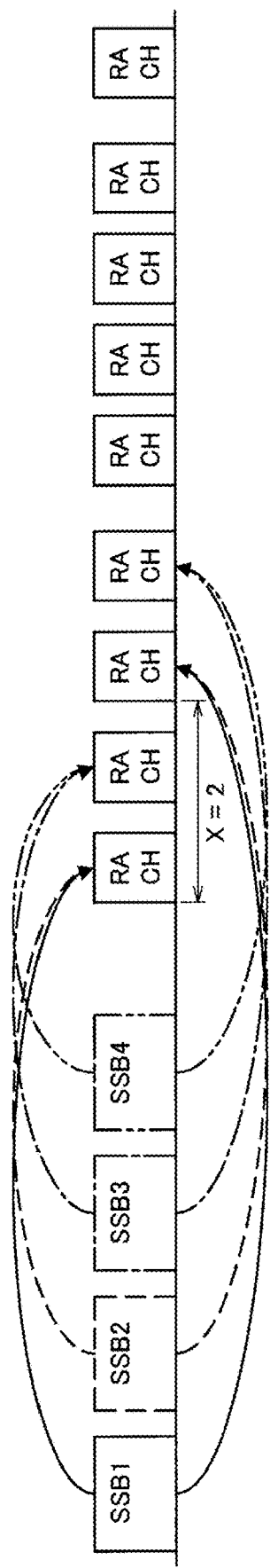
FIG. 13 is a diagram illustrating an overview of another idea of mapping from an SS block to an RO.

In 3GPP, an RACH transmission occasion (RO) is defined as time-frequency (T-F) resources for transmitting PRACH Msg1, using a set PRACH preamble format, in a Tx beam in one specific direction. Two candidates, one-to-one and many-to-one, have been studied as an idea of mapping from the SS block selected to be received to the RO. For example, FIG. 12 is a diagram illustrating an overview of an idea of mapping from an SS block to an RO, and illustrates an example of one-to-one mapping from the SS block to the RO. Furthermore, FIG. 13 is a diagram illustrating an overview of another idea of mapping from an SS block to an RO, and illustrates an example of many-to-one mapping from the SS block to the RO. The terminal device side transmits the Msg1 using information obtained by the RO.

(2) Msg2 (Random Access Response (RAR)) Reception

In 3GPP, it has been almost agreed that "the terminal device side can assume that a PDCCH demodulation reference signal (DMRS) and a PDSCH DMRS carrying Msg2 (RAR) are quasi co-located (QCL) with the SS block associated with the Msg1 and the RO previously transmitted by the terminal device side".

(3) Msg3 (Radio Resource Control (RRC) Connection Request) Transmission

In 3GPP, it has been almost agreed that "the base station side can assume that a USCH DMRS of Msg3 transmitted by the terminal device side is quasi co-located (QCL) with the Msg1 transmitted previously".

(4) Msg4 (RRC Connection Setup) Reception

In 3GPP, it has been almost agreed that "in a case where there is no beam report in the Msg3 of the RACH, the terminal device side can assume that a PDCCH DMRS and a PDSCH DMRS carrying Msg4 are quasi co-located (QCL) with the SS block associated with the Msg1 and the RO previously transmitted by the terminal device side".

Figure 14:
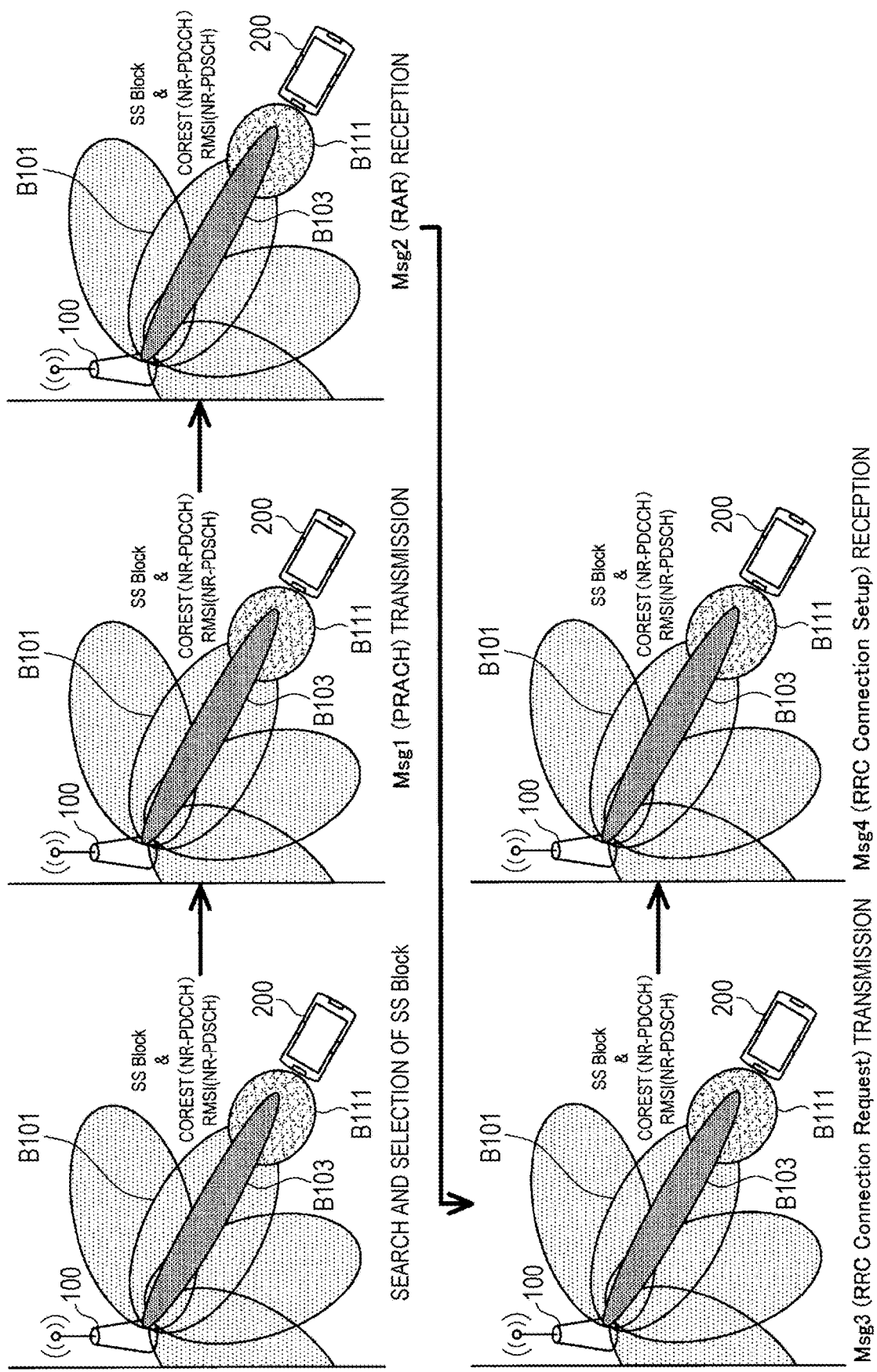
FIG. 14 is an explanatory diagram for describing a series of flows of a 4-step RACH.

Furthermore, FIG. 14 is an explanatory diagram for describing a series of flows of a 4-step RACH, and schematically illustrates a relationship between the base station and the terminal device in each procedure. In FIG. 14, reference numerals B101 and B103 schematically denote beams that the base station 100 uses to transmit and receive information to and from the terminal device 200 in the cell. Specifically, the beam B101 indicates a so-called wide beam whose beam width is caused to be relatively wide, and is used for transmission of the SS block, the COREST (NR-PDCCH), or the like. Furthermore, the beam B103 indicates a so-called narrow beam whose beam width is caused to be relatively narrow, and is used for transmission of the RMSI (NR-PDSCH) or the like. Furthermore, reference numeral B111 schematically denotes a beam that the terminal device 200 uses to transmit and receive information to and from the base station 100. In the example illustrated in FIG. 14, the beam B111 is formed as a wide beam.

As illustrated in FIG. 14, in an initial access procedure performed after the terminal device side has completed search and selection of an optimal SS block in the serving cell, transmission and reception of each of Msg1 to Msg4 are performed on the assumption that the beam synchronization with the SS block has been taken and the BPL state has been maintained. With such control, it becomes possible to quickly complete the initial access procedure.

In order to more quickly complete the initial access procedure including the random access procedure as described above, it can also be assumed that the terminal device side uses a wide beam to execute the initial access procedure. Therefore, in a series of procedures called a beam refinement (BR) operation, narrowing of a beam that the terminal device side uses for communication with the base station is performed, but the BR operation may be performed, for example, after the terminal device side shifts to an RRC CONNECTED mode. On the other hand, the beam refinement (BR) operation is not particularly defined at present depending on the implementation on a vendor side in specifications of 3GPP. Therefore, even in the initial access procedure, for example, a P2 procedure and a P3 procedure of the beam refinement (BR) operation in the Msg2 may be simultaneously performed on the terminal device side. That is, it can be mentioned that the terminal device side performs the beam refinement (BR) operation of the P2 procedure and the P3 procedure, and the BPL state by the narrow beam may be overlapped and performed in the initial access procedure before the terminal device side shifts to the RRC CONNECTED mode. Note that details of this case will be described later separately.

(Beam Management)

Next, a beam management (BM) procedure in 5G will be described focusing, particularly on a procedure for narrowing beams that the base station and the terminal device use for communication therebetween. For example, FIG. 15 is an explanatory diagram for describing an overview of a beam management procedure. In 3GPP, operations of beam management (BM) typified by P1, P2, and P3 procedures, as described above, are defined as a procedure for narrowing the beams. Beam refinement (BR) between the base station and the terminal device is performed by the P1, P2, and P3 procedures.

The P1 procedure is defined by beam selection and beam reselection. In the P1 procedure, basically, an operation of beam alignment at the time of initial access using a wide beam having a relatively wide beam width is assumed.

The P2 procedure is defined by Tx beam refinement. In the P2 procedure, an operation in which beam refinement (BR) is performed on a downlink (DL) Tx beam on the base station side and positioning (Beam correspondence) is performed between a narrow beam on the base station side where a beam width is further narrowed and a beam on the terminal device side is assumed.

The P3 procedure is defined by Rx beam refinement. In the P3 procedure, an operation in which beam refinement (BR) is performed on a DL Rx beam on the terminal device side and positioning (Beam correspondence) between a narrow beam on the base station side and a narrow beam on the terminal device side where a beam width is further narrowed is performed is assumed.

(Operation in CONNECTED Mode)

Figure 16:
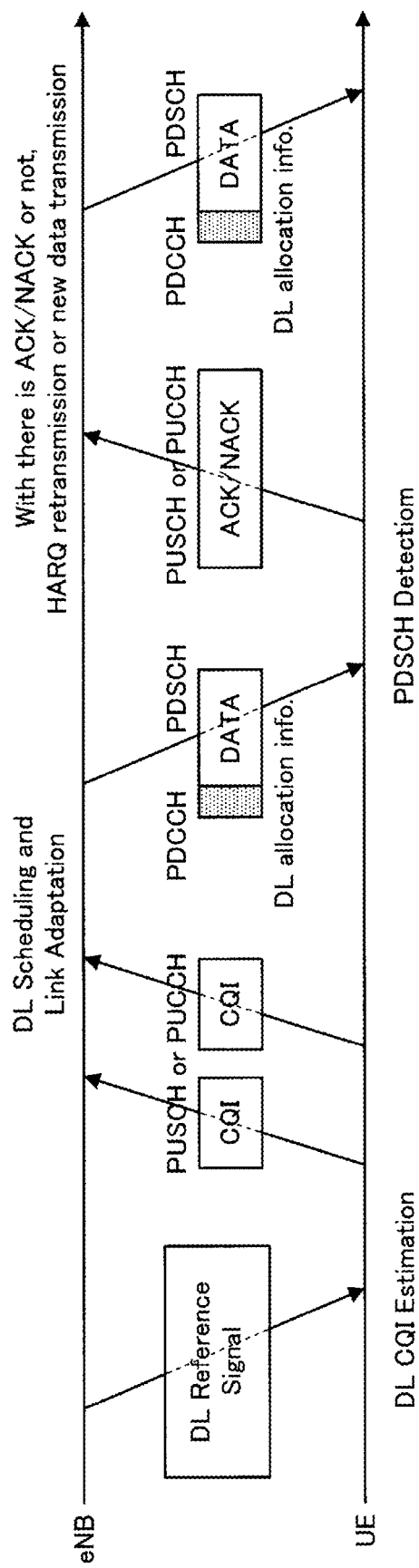
FIG. 16 is an explanatory diagram for describing an overview of a procedure related to transmission and reception of data between the base station and the terminal device in a CONNECTED mode.
Figure 17:
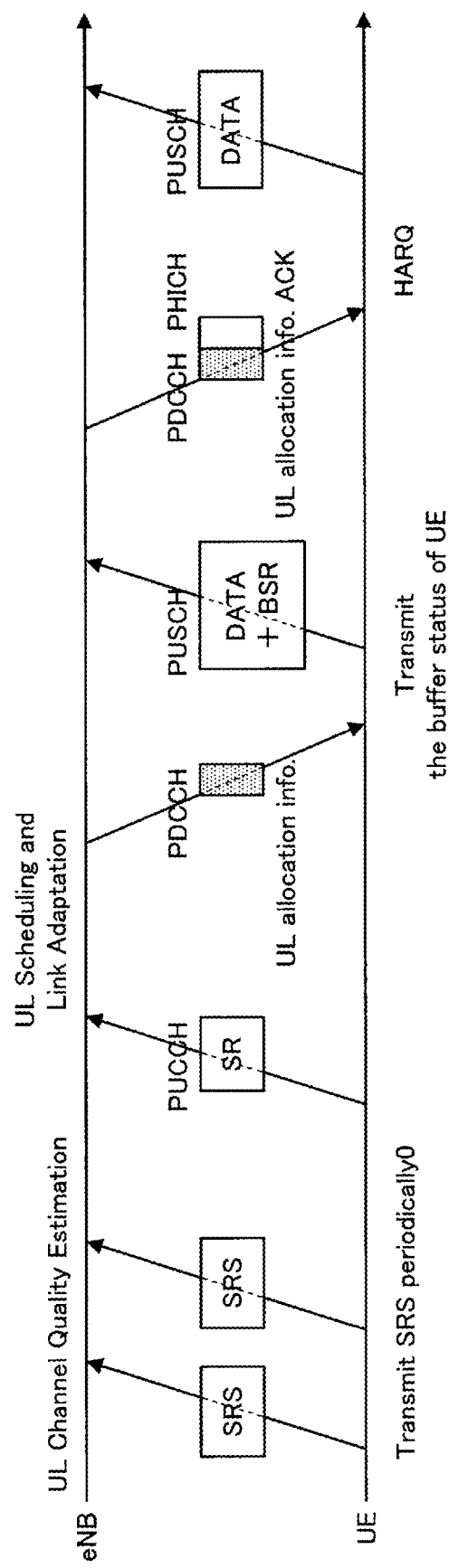
FIG. 17 is an explanatory diagram for describing an overview of a procedure related to transmission and reception of data between the base station and the terminal device in a CONNECTED mode.

Next, an operation in a CONNECTED mode will be described, mainly focusing on the operation assuming (spatial) QCL. For example, FIGS. 16 and 17 are explanatory diagrams for describing an overview of a procedure related to transmission and reception of data between the base station and the terminal device in a CONNECTED mode. Specifically, FIG. 16 illustrates an example of a procedure in a case where the terminal device receives DL data transmitted from the base station. Furthermore, FIG. 17 illustrates an example of a procedure in a case where the terminal device transmits UL data to the base station.

As described above, the beam refinement (BR) in the beam management (BM) typified by the P1, P2, and P3 procedures is generally performed after the terminal device side shifts to the RRC CONNECTED mode.

In 5G, it has been agreed that the terminal device side can assume that a reference signal (RS) for a DL corresponding to a transmission configuration indication (TCI) state of N-bits on downlink control information (DCI) is (spatially) quasi co-located (QCL) with respect to an NR-PDSCH. Furthermore, in order to reduce latency and additional signaling at the time of beam switching, it has been studied to transmit an NR-PDCCH (control signal) and the NR-PDSCH (data signal) with the same beam. In 3GPP, it has been discussed that an aperiodic channel state information-reference signal (CSI-RS) for beam management (BM) is assumed as the RS for the DL quasi co-located (QCL) with respect to the NR-PDSCH and the NR-PDCCH.

In a case where the aperiodic CSI-RS for the beam management (BM) is (spatially) quasi co-located (QCL) in the TCI state of the N bits on the DCI as described above, a beam sweep is performed by the P2 procedure described above using the aperiodic CSI-RS. Then, the beam refinement (BR) is performed in order to select the best beam of the aperiodic CSI-RS. When the P2 procedure is completed, the terminal device side signals a beam report indicating the best beam resource of the CSI-RS for the beam management (BM) to the base station side.

Furthermore, on the terminal device side, an Rx beam sweep by the P3 procedure is performed, and after the best Rx beam resource is determined, a new DCI field of N bits is signaled to the base station.

The NR-PDSCH and the NR-PDCCH in a case where the terminal device side shifts to the RRC CONNECTED mode are quasi co-located (QCL) using the aperiodic CSI-RS for the beam management (BM). Therefore, an operation of the P2 and P3 procedures is performed using the aperiodic CSI-RS, such that the BPL is established.

As described above, even in the RRC CONNECTED mode, reception of both of the NR-PDSCH and the NR-PDCCH is performed on the assumption that the BPL state is maintained, similarly to the initial access procedure. Specifically, with respect to the NR-PDSCH and the NR-PDCCH, it is assumed that beam synchronization with the aperiodic CSI-RS for the beam management (BM) that is (spatially) quasi co-located (QCL) has been taken and the BPL state has been maintained by performing narrowing of the beams by the P1, P2, and P3 procedures. That is, in the RRC CONNECTED mode, even in the reception of both of the NR-PDSCH and the NR-PDCCH on the terminal device side, the assumption of the (spatial) QCL with the RS for the DL from the base station side is considered as a mechanism for maintaining the BPL state.

3. Technical Problem

Next, a technical problem of the system according to the embodiment of the present disclosure will be described.

In the random access procedure at the time of initial access in 5G, after the search and the selection of the optimal SS block in the serving cell are completed, the (spatial) QCL is performed on the assumption that the BPL state between the base station and the terminal device is maintained, as described above. Therefore, it becomes possible to make the delay due to the beam sweep for establishing the BPL as small as possible.

Meanwhile, a situation where a beam direction of the BPL changes due to sudden rotation of the terminal device, or the like can be assumed. Specifically, in a case where unexpected sudden rotation or the like on the terminal device side occurs during the initial access procedure, the BPL state acquired at a point in time when the search and the selection of the optimal SS block at the time of the initial access have been completed may not be maintained.

Figure 18:
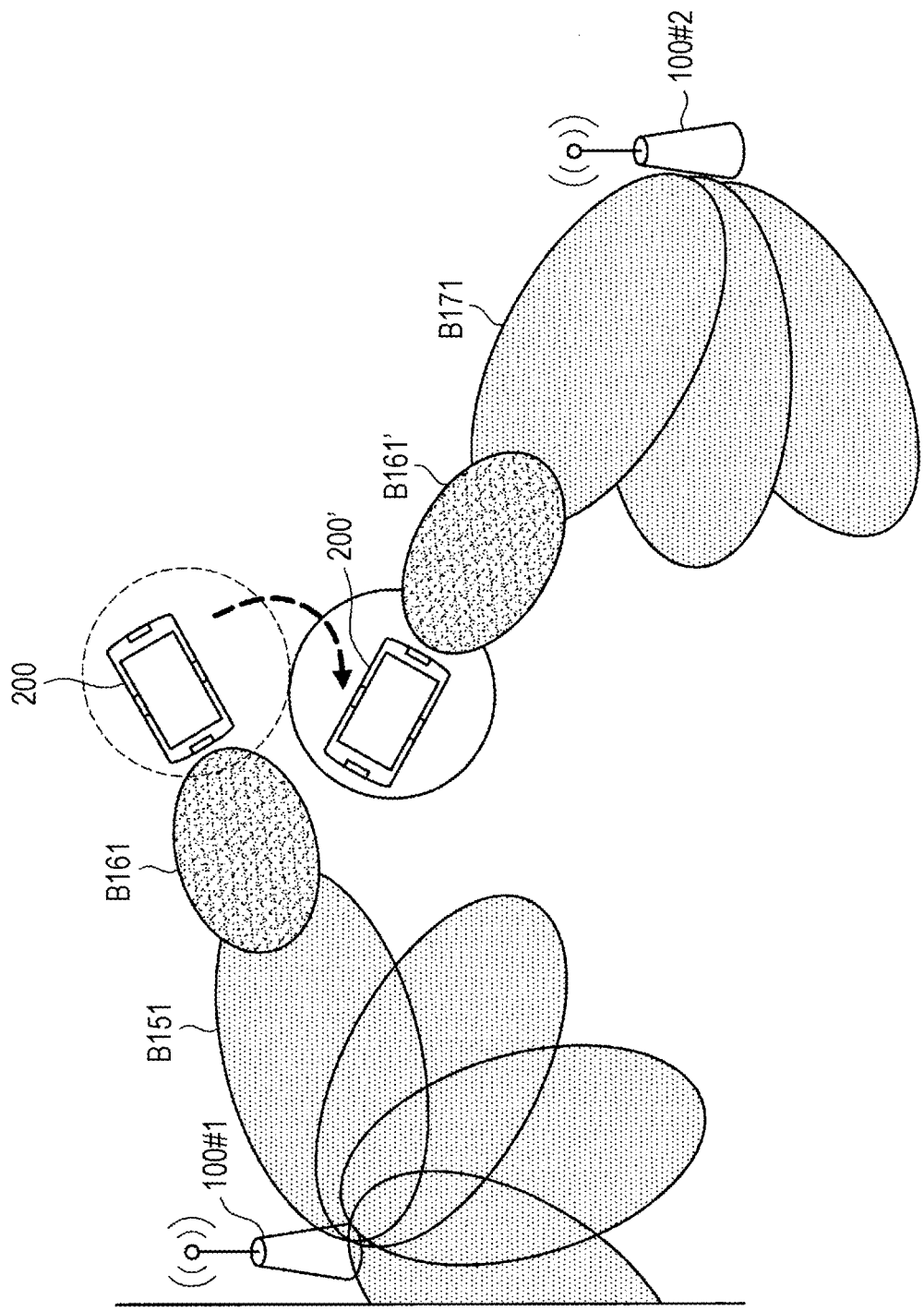
FIG. 18 is an explanatory diagram for describing an example of a case where a beam direction of a BPL changes.

For example, FIG. 18 is an explanatory diagram for describing an example of a case where a beam direction of a BPL changes, and illustrates an example of a case where the beam direction changes at the time of initial access. Specifically, FIG. 18 schematically illustrates a situation where a terminal device 200 in a BPL state with a base station 100 #1 suddenly rotates. Reference numeral 200' schematically denotes a state of the terminal device 200 after the rotation.

In FIG. 18, reference numeral B151 schematically denotes a directional beam formed by the base station 100 #1. Furthermore, reference numeral B161 schematically denotes a directional beam formed by the terminal device 200 before the rotation. That is, in the example illustrated in FIG. 18, the terminal device 200 before the rotation is in the BPL state with the base station 100 #1. More specifically, the beam B161 formed by the terminal device 200 before the rotation and the beam B151 formed by the base station 100 #1 establish a BPL with each other.

On the other hand, in accordance with rotation of the terminal device 200, a direction in which the beam B161 formed by the terminal device 200 is directed also changes. For example, reference numeral B161' schematically denotes a directional beam formed by the terminal device 200' after the rotation. Furthermore, reference numeral B171 schematically denotes a directional beam formed by a base station 100 #2. That is, in the example illustrated in FIG. 18, the beam B161' formed by the terminal device 200' after the rotation is directed in a direction in which a BPL can be established with the beam B171 formed by the base station 100 #2.

In a case where the rotation of the terminal device 200 as illustrated in FIG. 18 is generated, for example, at the time of initial access, the BPL state between the base station 100 #1 and the terminal device 200 acquired at a point in time when search and selection of an optimal SS block at the time of the initial access has been completed is not maintained. Therefore, for example, a situation where Msg1 in a random access procedure is transmitted toward another base station 100 #2 rather than the base station 100 #1 that has been originally in the BPL state with the terminal device 200 can be assumed. Such a situation does not satisfy the condition regarding the assumption of the (spatial) QCL at the time of the initial access, described above, such that a delay is generated in the random access procedure, and furthermore, a possibility that a subsequent RRC connection will be affected can also be assumed. Particularly, a mobile device is generally assumed to be driven by a battery. Under such an assumption, for example, in a terminal device mounted with four millimeter wave antenna array/subset modules, it is assumed to repeat the initial access procedure many times due to the delay in the random access procedure. In such a case, for example, an influence such as shortening of a battery life, an increase in a processing load due to continuation of an additionally occurring re-procedure, or the like can be assumed.

Furthermore, also in the CONNECTED mode, a case where a beam direction of the BPL changes due to sudden rotation of the terminal device, or the like, such that it becomes difficult to maintain the BPL state between the base station and the terminal device can be assumed.

For example, FIG. 19 is an explanatory diagram for describing another example of a case where a beam direction of a BPL changes, and illustrates an example of a case where the beam direction changes in a CONNECTED mode. Specifically, a left diagram of FIG. 19 illustrates a situation where a BPL state is established between a base station 100 and a terminal device 200. More specifically, reference numeral B201 schematically denotes a directional beam formed by the base station 100. Furthermore, reference numeral B203 schematically denotes a directional beam formed by the terminal device 200. That is, in the left diagram of FIG. 19, the beam B201 formed by the base station 100 and the beam B203 formed by the terminal device 200 establish a BPL with each other. In such a situation, for example, an NR-PDCCH and an NR-PDSCH, an aperiodic CSI-RS for beam management (BM), or the like, transmitted from the base station 100 are received by the terminal device 200.

On the other hand, a right diagram of FIG. 19 schematically illustrates a situation where the terminal device 200 suddenly rotates. Reference numeral 200' schematically denotes a state of the terminal device 200 after the rotation. Furthermore, reference numeral B203' schematically denotes a directional beam formed by the terminal device 200' after the rotation.

In the right diagram of FIG. 19, the beam B203 formed by the terminal device 200' after the rotation is directed in a direction different from the base station 100, such that it becomes difficult to maintain the BPL state between the base station 100 and the terminal device 200. In such a situation, an event called a beam failure first occurs, and if this state continues, an event of a call disconnection due to a radio link failure (RLF) occurs. That is, a situation where the call disconnection frequently occurs in accordance with the rotation of the terminal device 200 can also be assumed. Such a situation does not satisfy the condition regarding the assumption of the (spatial) QCL in the CONNECTED mode, described above, such that a subsequent RRC reconnection procedure or the like is required. Therefore, a possibility that realization of stable communication in the CONNECTED mode will be affected can be assumed. As described above, in a case where the RRC reconnection procedure or the like is required, the terminal device side may need to repeatedly perform the initial access procedure including the random access procedure described above from the beginning. There is a possibility that the operation described above will have an influence such as shortening of a battery life of the terminal device side which is a mobile device, an increase in a processing load due to continuation of an additionally occurring re-procedure, or the like, as described above.

In view of the situation as described above, the present disclosure proposes a technology capable of realizing wireless communication using a directional beam in a more suitable manner. Specifically, the present disclosure proposes a technology capable of further reducing a frequency at which communication between a base station and a terminal device is restricted even in a situation where a direction of the directional beam formed by the terminal device changes in accordance with the rotation of the terminal device, or the like.

4. Technical Feature

Hereinafter, a technical feature of the system according to the embodiment of the present disclosure will be described.

4.1. Basic Principle

First, a basic principle of a technology according to the present disclosure will be described. In the system according to the present disclosure, the terminal device is configured to be able to detect an orientation of a housing of the terminal device or an antenna element supported by the housing by various sensors such as, for example, a gyro sensor and the like. Under such a configuration, in a case where the direction of the directional beam changes in accordance with the change in the orientation, the terminal device recognizes the change in the orientation on the basis of a detection result of the sensor described above, and controls communication with the base station using a directional beam according to the change in the orientation.

For example, FIG. 20 is an explanatory diagram for describing a basic principle of a technology according to the present disclosure. In an example illustrated in FIG. 20, the terminal device 200 includes a plurality of antenna elements that performs wireless communication using directional beams directed in respective directions different from each other. In FIG. 20, reference numeral B211 schematically denotes a directional beam formed by the base station 100. Furthermore, reference numeral B213 schematically denotes a directional beam formed by an antenna element 210A among the plurality of antenna elements 210 included in the terminal device 200. Furthermore, reference numeral B215 schematically denotes a directional beam formed by another antenna element 210B different from the antenna element 210A among the plurality of antenna elements 210 included in the terminal device 200. Under such a configuration, a directional beam formed by at least any one of the plurality of antenna elements establishes a BPL with the directional beam formed by the base station 100.

An upper diagram of FIG. 20 schematically illustrates a situation where a BPL state is established between the base station 100 and the terminal device 200. That is, in the upper diagram of FIG. 20, the beam B211 formed by the base station 100 and the beam B213 formed by the antenna element 210A of the terminal device 200 establish a BPL with each other.

On the other hand, a lower diagram of FIG. 20 schematically illustrates a state in which the terminal device 200 has rotated from a state illustrated in the upper diagram of FIG. 20. That is, in the lower diagram of FIG. 20, in accordance with the rotation of the terminal device 200, the beam B213 formed by the antenna element 210A is directed in a direction different from a direction in which the base station 100 is located. That is, in the lower diagram of FIG. 20, it becomes difficult to maintain the BPL by the beam B211 formed by the base station 100 and the beam B213 formed by the antenna element 210A of the terminal device 200.

Meanwhile, in the lower diagram of FIG. 20, in accordance with the rotation of the terminal device 200, the beam B215 formed by another antenna element 210B different from the antenna element 210A is directed to the direction in which the base station 100 is located.

Therefore, the terminal device 200 (communication control unit 250) according to the embodiment of the present disclosure detects the change in the orientation of the terminal device 200, that is, a rotation direction or a rotation amount of the terminal device 200 on the basis of a detection result of acceleration, angular velocity, and the like by the detection unit 230 (for example, the gyro sensor and the like).

Specifically, the terminal device 200 sets an orientation of the terminal device 200 (in other words, an orientation of each antenna element 210), for example, in a case where the BPL state is established between the terminal device 200 and the base station 100, as illustrated in the upper diagram of FIG. 20, as a reference state. As a more specific example, in a case of focusing on an initial access procedure, on a terminal device 200 side, the best SS block satisfying a threshold condition in a serving cell is selected by performing a beam sweep on all subsets of the plurality of antenna elements 210. Furthermore, in a subsequent random access procedure, (spatial) QCL is performed on the assumption that beam synchronization with the selected SS block described above has been taken and the BPL state has been maintained. Therefore, for example, the fact that the beam synchronization with the SS block has been taken may be considered as a point in time when decoding of a PBCH in an SS block having reference signal received power (RSRP) satisfying the threshold condition set from a network side within a cell or decoding of a CORESET and RMSI having a (spatial) QCL relationship with the SS block as described above has been completed, and an orientation of the terminal device 200 at this point in time may be set as the reference state.

With the control as described above, even in a case where the orientation of the terminal device 200 changes due to sudden rotation or the like, the terminal device 200 can detect the change in the orientation (that is, the rotation direction and the rotation amount) from the reference state on the basis of the detection result by the detection unit 230. As a specific example, in a case of an example illustrated in the lower diagram of FIG. 20, the terminal device 200 can recognize that the beam B215 formed by the antenna element 210B is directed to the direction in which the base station 100 is located, on the basis of the detection result by the detection unit 230.

Then, the terminal device 200 selectively switches the antenna element 210 used for wireless communication with the base station 100 according to a detection result of the change in the orientation of the terminal device 200. Specifically, in the case of the example illustrated in the lower diagram of FIG. 20, the terminal device 200 switches the antenna element 210 used for the wireless communication with the base station 100 from the antenna element 210A to the antenna element 210B according to a recognition result of the orientation of the terminal device 200 after the rotation. On the basis of such control, the terminal device 200 quickly re-establishes the BPL state with the base station 100 using the beam B215 formed by the antenna element 210B even in a case where it becomes difficult to maintain the BPL state with the base station 100 using the beam B213.

With the control as described above, for example, even in a case where the orientation of the terminal device 200 changes due to the sudden rotation or the like in the course of the initial access procedure, the beam from the terminal device 200 is directed to the base station 100 according to a condition regarding an assumption of the (spatial) QCL. Therefore, in a case where the orientation of the terminal device 200 changes, it becomes possible to immediately re-establish the BPL state between the terminal device 200 and the base station 100, and it becomes thus possible to quickly complete the initial access procedure.

Note that an example of a case where four antenna elements 210 capable of performing wireless communication using millimeter waves are supported for the terminal device 200 so as to be directed in directions different from each other has been described in the example illustrated in FIG. 20, but a configuration of the terminal device 200 is not necessarily limited. That is, as long as two or more of the plurality of antenna elements 210 are supported so as to face directions different from each other, the configuration of the terminal device 200 (more specifically, the number of antenna elements 210 or a position where each antenna element 210 is supported) is not particularly limited. Note that in the present embodiment, ideally, it is more desirable that each of the plurality of antenna elements 210 supported for the terminal device 200 can configure a quasi-omni antenna pattern similar to LTE by performing the beam sweep.

Next, an example of a case of controlling directions of directional beams (particularly, narrow beams) formed by each antenna element 210 according to the rotation of the terminal device 200 will be described. Note that in the present description, an example of control of beams according to the change in the orientation of the terminal device 200 will be described, mainly focusing on a case where communication is performed using narrow beams as in a CONNECTED mode.

For example, FIG. 21 is an explanatory diagram for describing a basic principle of a technology according to the present disclosure, and illustrates an example of a case of controlling directions of directional beams formed by each antenna element 210. In FIG. 21, reference numeral B211 schematically denotes a directional beam formed by the base station 100. Furthermore, reference numerals B221 and B223 schematically denote directional beams (narrow beam) formed in directions different from each other by an antenna element 210A, respectively.

For example, an upper diagram of FIG. 21 schematically illustrates a situation where a BPL state is established between the base station 100 and the terminal device 200. That is, in the upper diagram of FIG. 20, the beam B211 formed by the base station 100 and the beam B221 formed by the antenna element 210A of the terminal device 200 establish a BPL with each other.

On the other hand, a lower diagram of FIG. 21 schematically illustrates a state in which the terminal device 200 has rotated from a state illustrated in the upper diagram of FIG. 21. That is, in the lower diagram of FIG. 21, in accordance with the rotation of the terminal device 200, the beam B221 formed by the antenna element 210A is directed in a direction different from a direction in which the base station 100 is located. That is, in the lower diagram of FIG. 20, it becomes difficult to maintain the BPL by the beam B211 formed by the base station 100 and the beam B221 formed by the antenna element 210A of the terminal device 200.

Meanwhile, in the lower diagram of FIG. 21, even after the rotation of the terminal device 200, the base station 100 is located within a range in which the antenna element 210A can generate directional beams (narrow beams) (in other words, within a range of a beam sweep). Specifically, the beam B223 formed in a different direction from that of the beam B221, of the beams generated by the antenna element 210A is directed in the direction in which base station 100 is located.

Therefore, in such a case, the terminal device 200 (communication control unit 250) may re-establish the BPL state with the base station 100 by controlling the direction of the beam formed by the antenna element 210A.

Specifically, the terminal device 200 sets an orientation of the terminal device 200 (in other words, an orientation of each antenna element 210) in a case where the BPL state is established between the terminal device 200 and the base station 100, as illustrated in the upper diagram of FIG. 21, as a reference state. Furthermore, the terminal device 200 detects the change in the orientation of the terminal device 200, that is, a rotation direction or a rotation amount of the terminal device 200 on the basis of a detection result of acceleration, angular velocity, and the like by the detection unit 230 (for example, the gyro sensor and the like). Therefore, even in a case where the orientation of the terminal device 200 changes due to sudden rotation or the like, the terminal device 200 can detect the change in the orientation (that is, the rotation direction and the rotation amount) from the reference state described above on the basis of the detection result by the detection unit 230. As a specific example, in a case of an example illustrated in the lower diagram of FIG. 21, the terminal device 200 can recognize that the beam B223 formed by the antenna element 210A is directed to the direction in which the base station 100 is located, on the basis of the detection result by the detection unit 230.

Note that at the time of an operation in a CONNECTED mode, the terminal device 200 performs reception of both of an NR-PDSCH and an NR-PDCCH on the assumption that the BPL state is maintained, using an antenna element 210 selected in an initial access procedure. Specifically, with respect to the NR-PDSCH and the NR-PDCCH, and it is assumed that beam synchronization with an aperiodic CSI-RS for beam management (BM) that is (spatially) quasi co-located (QCL) has been taken and the BPL state has been maintained by performing narrowing of beams by P1, P2, and P3 procedures. That is, since the reception is performed on the basis of the (spatial) QCL on the assumption that the best beam synchronization with the aperiodic CSI-RS for the beam management (BM) described above has been taken and the BPL state has been maintained, the fact that the beam synchronization with the aperiodic CSI-RS for the beam management (BM) has been taken may be considered as a point in time when signaling has been performed in a new DCI field of N bits as an example, and an orientation of the terminal device 200 at this point in time may be set as the reference state.

Then, the terminal device 200 controls the direction of the directional beam formed by the antenna element 210A according to a detection result of the change in the orientation of the terminal device 200. Specifically, in the case of the example illustrated in the lower diagram of FIG. 21, the terminal device 200 switches the beam used for the wireless communication with the base station 100 from the beam B221 to the beam B223 according to a recognition result of the orientation of the terminal device 200 after the rotation. On the basis of such control, the terminal device 200 quickly re-establishes the BPL state with the base station 100 using the beam B223 even in a case where it becomes difficult to maintain the BPL state with the base station 100 using the beam B221.

Note that even at the time of communication using a narrow beam, in a case where the orientation of the terminal device 200 significantly changes due to sudden rotation or the like, it may be difficult to re-establish the BPL state between the terminal device 200 and the base station 100 using an antenna element 210 similar to that before the change. For example, FIG. 22 is an explanatory diagram for describing a basic principle of a technology according to the present disclosure, and illustrates an example of beam control according to a change in the orientation of the terminal device 200 at the time of communication using a narrow beam. In FIG. 22, reference numeral B211 schematically denotes a directional beam formed by the base station 100. Furthermore, reference numeral B221 schematically denotes a directional beam (narrow beam) formed by an antenna element 210A among the plurality of antenna elements 210 included in the terminal device 200. Furthermore, reference numeral B225 schematically denotes a directional beam (narrow beam) formed by another antenna element 210B different from the antenna element 210A among the plurality of antenna elements 210 included in the terminal device 200.

An upper diagram of FIG. 22 schematically illustrates a situation where a BPL state is established between the base station 100 and the terminal device 200. That is, in the upper diagram of FIG. 22, the beam B211 formed by the base station 100 and the beam B221 formed by the antenna element 210A of the terminal device 200 establish a BPL with each other.

On the other hand, a lower diagram of FIG. 22 schematically illustrates a state in which the terminal device 200 has rotated from a state illustrated in the upper diagram of FIG. 22. That is, in the lower diagram of FIG. 22, in accordance with the rotation of the terminal device 200, the base station 100 is located outside a range in which the antenna element 210A can generate directional beams (narrow beams) (in other words, outside a range of a beam sweep). That is, in the lower diagram of FIG. 22, it becomes difficult to maintain the BPL by the beam B211 formed by the base station 100 and the beam (for example, the beam B221) formed by the antenna element 210A of the terminal device 200.

Meanwhile, in the lower diagram of FIG. 22, in accordance with the rotation of the terminal device 200, the base station 100 is located within a range in which another antenna element 210B different from the antenna element 210A can generate directional beams (narrow beams). Specifically, the beam B225 of the beams generated by the antenna element 210B is directed to a direction where base station 100 is located.

Therefore, in such a case, the terminal device 200 (communication control unit 250) switches the antenna element 210 used for the wireless communication with the base station 100 from the antenna element 210A to the antenna element 210B according to a detection result of the change in the orientation of the terminal device 200. Furthermore, the terminal device 200 controls the direction of the directional beam formed by the antenna element 210B according to the detection result of the change in the orientation described above. In the lower drawing of FIG. 22, the beam B225 corresponds to the beam whose direction has been controlled by the terminal device 200. On the basis of such control, the terminal device 200 quickly re-establishes the BPL state with the base station 100 using the beam B223 formed by the antenna element 210B even in a case where it becomes difficult to maintain the BPL state with the base station 100 using the beam B221.

With the control as described above, for example, even in a case where the orientation of the terminal device 200 changes due to the sudden rotation or the like at the time of an operation in the CONNECTED mode, the beam from the terminal device 200 is directed to the base station 100 according to a condition regarding an assumption of the (spatial) QCL. Therefore, even in a case where the orientation of the terminal device 200 changes, the terminal device 200 can immediately re-establish the BPL state with the base station 100. Therefore, the terminal device 200 can re-establish the BPL state with the base station 100 before the call disconnection due to the RLF occurs, for example, even though the beam failure occurs due to the change in the orientation of the terminal device 200 caused by the sudden rotation or the like. Furthermore, ideally, the terminal device 200 can re-establish the BPL state with the base station 100 before the occurrence of the beam failure even though the orientation of the terminal device 200 changes due to the sudden rotation or the like.

Note that the example described with reference to FIGS. 20 to 22 is merely an example, and does not necessarily limit the operation related to the control of the communication with the base station 100 using the directional beam, according to the change in the orientation of the terminal device 200, by the terminal device 200 according to the present embodiment.

For example, if the reference state is set in a state in which the radio signal transmitted using at least the directional beam from the base station can be received via any one of the one or more antenna elements described above, a condition for setting the reference state may be appropriately changed. As a specific example, if the terminal device 200 is in a state in which reception power (for example, RSRP) of the radio signal transmitted using the directional beam from the base station 100 is equal to or larger than a threshold, the terminal device 200 can set the reference state at any timing on the basis of a detection result of the orientation at the timing. Furthermore, as another example, if the terminal device 200 is in a state in which it can receive a signal block transmitted from the base station 100 for every directional beam using a synchronization signal and a control signal as one unit, such as the SS block described above, the terminal device 200 can set the reference state at any timing on the basis of a detection result of the orientation at the timing.

Furthermore, an opportunity by which the terminal device 200 detects the change in the orientation of the terminal device 200 is not particularly limited. As a specific example, the terminal device 200 may detect the change in the orientation of the terminal device 200 from the previously set reference state by sequentially monitoring the detection result by the detection unit 230 at every predetermined timing. With such control, the terminal device 200 can also detect the change in the orientation of the terminal device 200 in real time. Furthermore, as another example, the terminal device 200 may detect the change in the orientation of the terminal device 200 by acquiring the detection result by the detection unit 230 using a predetermined event as a trigger. As a more specific example, the terminal device 200 may detect the change in the orientation of the terminal device 200 from the previously set reference state using the occurrence of the beam failure as a trigger.

Hereinabove, the basic principle of the technology according to the present disclosure has been described with reference to FIGS. 20 to 22.

4.2. Processing

Next, an example of processing related to control of communication with the base station 100 by the terminal device 200 according to the present embodiment will be described.

(Flow of Processing in Initial Access)

First, an example of processing related to control of communication with the base station 100 by the terminal device 200 according to the present embodiment will be described, focusing on an initial access procedure. Note that in the present description, a flow of processing focusing on an initial access procedure in non-standalone (NSA) assuming use with an existing LTE network and a flow of processing focusing on an initial access procedure in standalone (SA) that can be operated only on an NR network will be each described.

Figure 23:
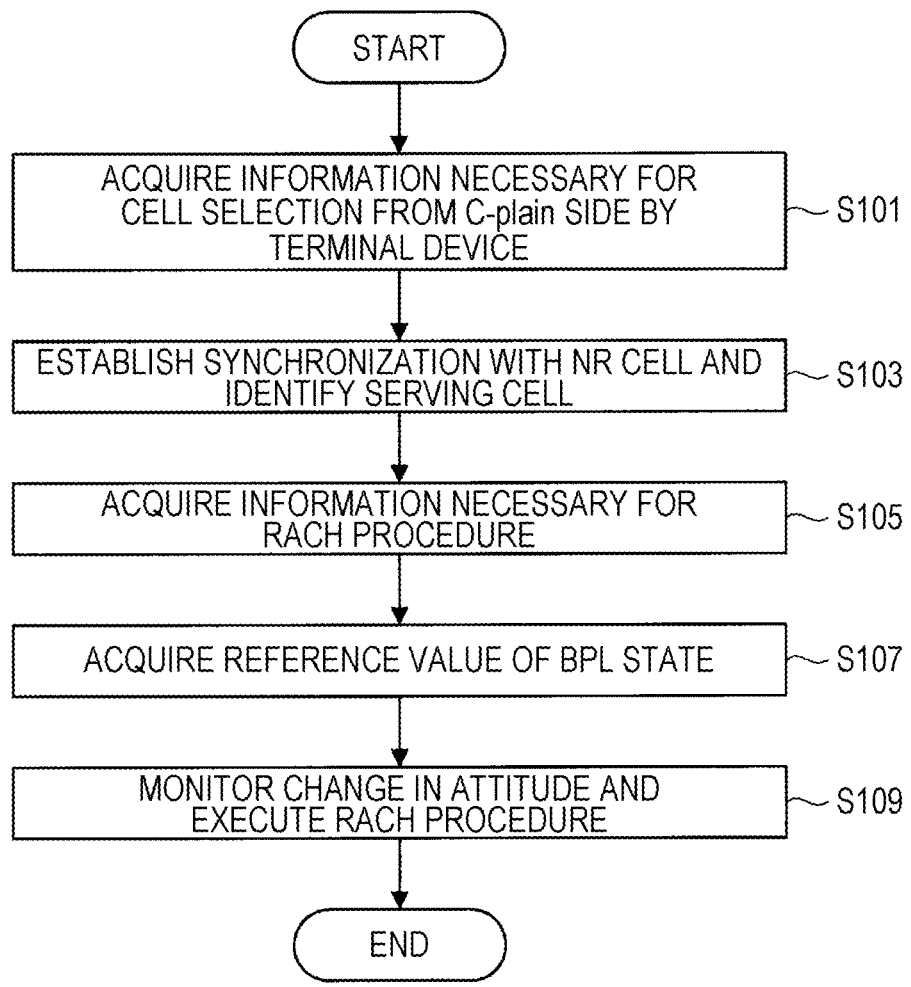
FIG. 23 is a flowchart illustrating an example of a flow of processing related to control of communication with the base station by the terminal device according to the embodiment.

First, an example of a flow of processing related to control of communication with the base station 100 by the terminal device 200 will be described, focusing on the initial access procedure in the NSA with reference to FIG. 23. FIG. 23 is a flowchart illustrating an example of a flow of processing related to control of communication with the base station 100 by the terminal device 200 according to the present embodiment, and illustrates the initial access procedure in the NSA.

In a case of NSA, the terminal device 200 side is connected to a network based on an LTE standard as an anchor. Therefore, in this case, the terminal device 200 acquires information necessary for cell selection at the time of initial access to the NR network, from C-plain transmitted via the LTE network (S101).

Next, the terminal device 200 performs search and selection of an optimal SS block in a serving cell on the basis of the acquired information described above, establishes synchronization with an NR cell, and performs identification of the serving cell by detecting an NR cell ID (S103).

Next, the terminal device 200 acquires information necessary for a random access procedure from a CORESET and RMSI frequency-division multiplexed (FDM) within a (spatially) quasi co-located (QCL) beam when performing the identification of the serving cell (S105). Furthermore, it is possible to assume that the BPL state has been established between the base station 100 and the terminal device 200 at a point in time when the information necessary for the random access procedure is obtained. Therefore, the terminal device 200 sets an orientation of the terminal device 200 at this time (in other words, an orientation of each antenna element 210) as a reference state. Specifically, the terminal device 200 holds information according to a detection result by the detection unit 230 in Layer 1 as a reference value of the BPL state (S107). Note that, as described above, when the random access procedure is performed, the terminal device 200 can set the reference state. That is, the terminal device 200 can set the reference state at least after a transmission opportunity of MSG1 (PRACH preamble), in the initial access procedure.

Then, the terminal device 200 monitors the change in the orientation of the terminal device 200 on the basis of, for example, the detection result by the detection unit 230 (for example, the gyro sensor and the like), and controls the communication with the base station 100 using the directional beam in a case where the orientation has changed due to the sudden rotation or the like (S109). As a specific example, the terminal device 200 controls the direction of the directional beam used for the communication with the base station 100 according to the rotation direction or the rotation amount of the terminal device 200. Furthermore, at this time, the terminal device 200 may switch the antenna element 210 used for forming the directional beam according to the rotation direction or the rotation amount of the terminal device 200.

With the control as described above, the terminal device 200 can immediately re-establish the BPL state with the base station 100 even in a case where the orientation of the terminal device 200 changes due to the sudden rotation or the like, such that it has become difficult to maintain the BPL state with the base station 100.

Hereinabove, the example of the flow of the processing related to the control of the communication with the base station 100 by the terminal device 200 has been described, focusing on the initial access procedure in the NSA with reference to FIG. 23.

Next, an example of a flow of processing related to control of communication with the base station 100 by the terminal device 200 will be described, focusing on the initial access procedure in the SA with reference to FIG. 24. FIG. 24 is a flowchart illustrating another example of a flow of processing related to control of communication with the base station 100 by the terminal device 200 according to the present embodiment, and illustrates the initial access procedure in the SA.

In a case of the SA, the terminal device 200 uses information regarding initial access such as SCS and the like corresponding to a carrier frequency determined in specifications. That is, the terminal device 200 performs search and selection of an optimal SS block in a serving cell on the basis of the information described above, establishes synchronization with an NR cell, and performs identification of the serving cell by detecting an NR cell ID (S131).

Next, the terminal device 200 acquires information necessary for a random access procedure from a CORESET and RMSI frequency-division multiplexed (FDM) within a (spatially) quasi co-located (QCL) beam when performing the identification of the serving cell (S133). Furthermore, it is possible to assume that the BPL state has been established between the base station 100 and the terminal device 200 at a point in time when the information necessary for the random access procedure is obtained. Therefore, the terminal device 200 sets an orientation of the terminal device 200 at this time (in other words, an orientation of each antenna element 210) as a reference state. Specifically, the terminal device 200 holds information according to a detection result by the detection unit 230 in Layer 1 as a reference value of the BPL state (S135).

Then, the terminal device 200 monitors the change in the orientation of the terminal device 200 on the basis of, for example, the detection result by the detection unit 230 (for example, the gyro sensor and the like), and controls the communication with the base station 100 using the directional beam in a case where the orientation has changed due to the sudden rotation or the like (S137). As a specific example, the terminal device 200 controls the direction of the directional beam used for the communication with the base station 100 according to the rotation direction or the rotation amount of the terminal device 200. Furthermore, at this time, the terminal device 200 may switch the antenna element 210 used for forming the directional beam according to the rotation direction or the rotation amount of the terminal device 200.

With the control as described above, in a case where the orientation of the terminal device 200 changes, it becomes possible to immediately re-establish the BPL state between the terminal device 200 and the base station 100, and it becomes thus possible to quickly complete the initial access procedure.

Hereinabove, the example of the flow of the processing related to the control of the communication with the base station 100 by the terminal device 200 has been described, focusing on the initial access procedure in the SA with reference to FIG. 24.

(Flow of Processing in CONNECTED Mode)

Next, an example of processing related to control of communication with the base station 100 by the terminal device 200 according to the present embodiment will be described, focusing on control in a case where communication using a narrow beam is performed in a CONNECTED mode. For example, FIG. 25 is a flowchart illustrating an example of a flow of processing related to control of communication with the base station 100 by the terminal device 200 according to the present embodiment, and illustrates an example of the control in a case where the communication using the narrow beam is performed in the CONNECTED mode. Note that in the NSA and the SA, sequences of initial access are different from each other about a transition of each state until the terminal device becomes a CONNECTED state, but a description will be provided on the assumption that similar sequences are applied except for the sequences of the initial access. That is, the flow of processing illustrated in FIG. 25 is common in the NSA and the SA.

As illustrated in FIG. 25, when the terminal device 200 shifts to an RRC CONNECTED mode, the terminal device 200 performs a beam sweep using a narrow beam in a beam management (BM) procedure (particularly, P2 and P3 procedures). At this time, the terminal device 200 performs the beam sweep described above using an aperiodic CSI-RS for beam management (BM) is (spatially) quasi co-located (QCL) with respect to an NR-PDSCH and an NR-PDCCH within a serving cell, in a TCI state of N bits on DCI, for example. Then, terminal device 200 performs beam refinement (BR) in order to select the best beam of the aperiodic CSI-RS (S151). Note that the P2 procedure and the P3 procedure may be performed simultaneously on the aperiodic beam of the CSI-RS for the beam management (BM) in order to reduce latency and additional signaling at the time of beam switching.

When establishment of a BPL state in the narrow beam between the base station 100 and the terminal device 200 is completed according to the procedure described above, the terminal device 200 signals information regarding the best Rx beam resource in a new DCI field of N bits (S153). Furthermore, at a point in time when the signaling of the information regarding the best Rx beam resource for the new DCI field of the N bits is performed, it can be assumed that a BPL state has been established between the base station 100 and the terminal device 200. Therefore, the terminal device 200 sets an orientation of the terminal device 200 at this time (in other words, an orientation of each antenna element 210) as a reference state. Specifically, the terminal device 200 holds information according to a detection result by the detection unit 230 in Layer 1 as a reference value of the BPL state (S155).

Thereafter, the terminal device 200 monitors the change in the orientation of the terminal device 200 on the basis of, for example, the detection result by the detection unit 230 (for example, the gyro sensor and the like), and controls the communication with the base station 100 using the directional beam in a case where the orientation has changed due to the sudden rotation or the like (S137). As a specific example, the terminal device 200 controls the direction of the directional beam used for the communication with the base station 100 according to the rotation direction or the rotation amount of the terminal device 200. Furthermore, at this time, the terminal device 200 may switch the antenna element 210 used for forming the directional beam according to the rotation direction or the rotation amount of the terminal device 200. Such control is continued until the CONNECTED mode is released, for example.

With the control as described above, the terminal device 200 can stably receive DL channel signals of both of the NR-PDSCH and the NR-PDCCH in the serving cell.

Figure 26:
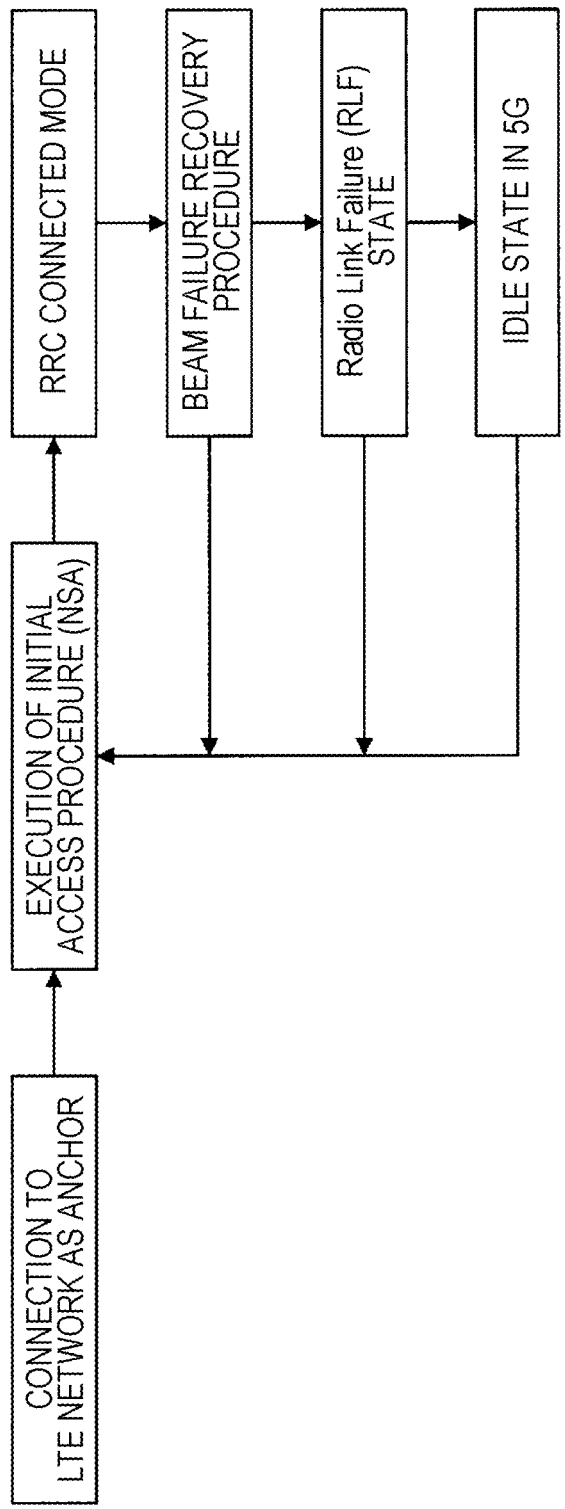
FIG. 26 is a diagram illustrating an example of a state transition diagram until the terminal device transitions to a radio resource control (RRC) CONNECTED state in the NSA.
Figure 27:
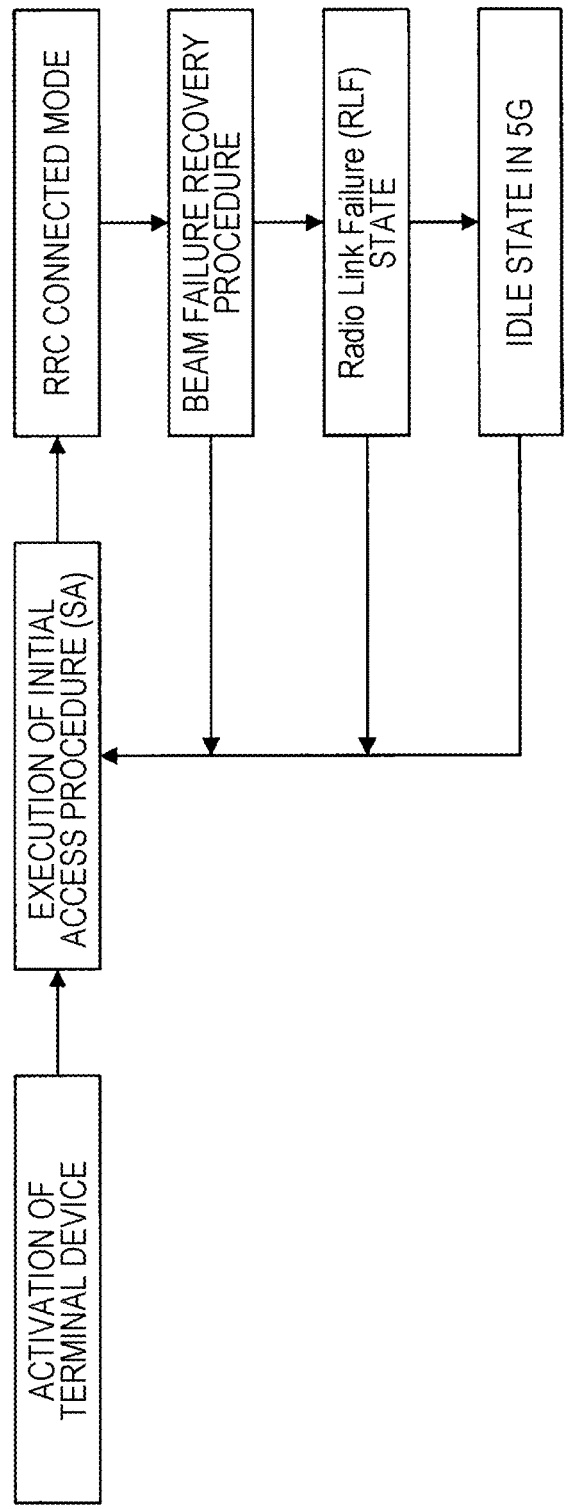
FIG. 27 is a diagram illustrating an example of a state transition diagram until the terminal device transitions to an RRC CONNECTED state in an SA.

Note that, for reference, FIG. 26 and FIG. 27 illustrate an example of a state transition diagram until the terminal device transitions to an RRC CONNECTED state in 5G for each of the NSA and the SA. FIG. 26 is a diagram illustrating an example of a state transition diagram until the terminal device transitions to an RRC CONNECTED state in the NSA. Furthermore, FIG. 27 is a diagram illustrating an example of a state transition diagram until the terminal device transitions to an RRC CONNECTED state in the SA. As can be seen from a comparison between FIG. 26 and FIG. 27, in the NSA and the SA, state transitions are substantially the same as each other except that initial access procedures are different from each other.

Hereinabove, the example of the processing related to the control of the communication with the base station 100 by the terminal device 200 according to the present embodiment has been described.

4.3. Modification

Next, modifications of the system according to the present embodiment will be described.

(Modification 1: Example of Execution Timing of Beam Management (BM) Procedure)

First, as modification 1, an example of an execution timing of a beam management (BM) procedure will be described. In the above, the initial access and the beam management (BM) procedure have been described separately. Meanwhile, as described above, in the 3GPP specifications, the execution timing of the beam management (BM) procedure is defined depending on the implementation. Therefore, for example, the initial access procedure and the beam management (BM) procedure may be executed in parallel.

As a specific example, the terminal device 200 may execute the P2 and P3 procedures in the beam management (BM) procedure in parallel when receiving the Msg2 in the initial access procedure. That is, the terminal device 200 may execute establishment of the BPL state by the narrow beam in accordance with the beam refinement (BR) in the P2 and P3 procedures at the time of initial access before shifting to the CONNECTED mode. The setting of the reference state in this case can be performed, for example, by a method similar to that of the example described above as an operation in the CONNECTED mode. In other words, in the beam management (BM) procedure, if a procedure is a procedure from the P1 procedure, an orientation at that time can be set as the reference state.

With the control as described above of the modification of the present embodiment, the terminal device 200 can quickly complete the random access procedure in the initial access while maintaining the BPL state with the base station 100 by the narrow beam, for example, even in a case where sudden rotation of the terminal device 200 occurs.

(Modification 2: Correction of Direction of Beam)

Next, as modification 2, control of a direction of a beam after the BPL state is re-established will be described. As described above, the terminal device 200 according to the present embodiment quickly re-establishes the BPL state with the base station 100 on the basis of the detection result of the change in the orientation of the terminal device 200 even in a case where it becomes difficult to maintain the BPL state with the base station 100 due to the rotation of the terminal device 200, or the like, by using the detection result of the change in the orientation of the terminal device 200. Meanwhile, the direction of the directional beam (narrow beam) after the control based on the detection result by the detection unit 230 such as the gyro sensor and the like may deviate from direction in which the BPL state with the base station 100 can be re-established due to another factor such as an obstacle, movement of the terminal device 200, or the like. In such a case, the terminal device 200 may newly correct the direction of the narrow beam after the control based on the detection result of the change in the orientation of the terminal device 200 from a reference position. Note that in the following description, for convenience, the narrow beam after being controlled on the basis of the detection result of the change in the orientation of the terminal device 200 from the reference position is also simply referred to as "a narrow beam after control according to a change in an orientation". Furthermore, the narrow beam before being controlled on the basis of the detection result of the change in the orientation of the terminal device 200 from the reference position is also simply referred to as "a narrow beam before a change in an orientation".

For example, the terminal device 200 may specify a more suitable direction of the narrow beam again by sweeping the narrow beam again around the direction of the narrow beam after the control according to the change in the orientation. On the basis of such control, the terminal device 200 may search for the direction of the narrow beam in which, for example, a received power level represented by the RSRP is equal to that of the BPL state before the change in the orientation, by sweeping the narrow beam again.

Furthermore, as another example, the terminal device 200 may sweep the narrow beam in a predetermined order without being limited to the direction of the narrow beam after the control according to the change in the orientation, at the time of sweeping the narrow beam again. As a specific example, the terminal device 200 may specify a more suitable direction of the narrow beam again by sweeping a range in which the antenna element 210 used for communication with the base station 100 can generate a narrow beam from one end portion to the other end portion in a predetermined direction, at the time of sweeping the narrow beam again.

Furthermore, the terminal device 200 may determine whether or not to specify the narrow beam again by sweeping the narrow beam again as described above, on the basis of a predetermined condition. As a specific example, the terminal device 200 may determine whether or not to specify the narrow beam again by sweeping the narrow beam again according to a state of the communication with the base station 100 using the narrow beam after the control based on the detection result of the change in the orientation of the terminal device 200.

As a more specific example, the terminal device 200 may determine whether or not to specify the narrow beam again according to whether or not a communication quality (for example, a received power level represented by the RSRP) in the communication with the base station 100 using the narrow beam after the control according to the change in the orientation is equal to that of the BPL state before the change in orientation.

Furthermore, as another example, the terminal device 200 may determine whether or not to specify the narrow beam again according to whether or not the communication quality in the communication with the base station 100 using the narrow beam after the control according to the change in the orientation satisfies a required communication rate (for example, an MCS, a rank, or the like).

Furthermore, as another example, the terminal device 200 may determine whether or not to specify the narrow beam again according to whether or not the communication quality (for example, the received power level represented by the RSRP) in the communication with the base station 100 using the narrow beam after the control according to the change in the orientation is equal to or larger than a predetermined threshold. In this case, the terminal device 200 may perform control not to specify the narrow beam again, for example, if the communication quality in the communication with the base station 100 using the narrow beam after the control according to the change in the orientation is equal to or larger than a threshold predetermined from a network side even though the communication quality has been deteriorated as compared with the BPL state before the change in the orientation.

With the control as described above, the terminal device 200 can re-establish the BPL state with the base station 100 in a more suitable manner according to a situation at each time.

(Modification 3: Example of Control in Communication Using Polarization)

Next, as modification 3, an example of a method of applying the technology according to the present disclosure to communication using polarization will be described. In the embodiment described above, in order to allow a feature of the technology according to the present disclosure to be more easily understood, the description has been provided, focusing on a change in a two-dimensional orientation of the terminal device 200. Meanwhile, by using the detection result by the detection unit 230 such as the gyro sensor and the like, it is possible to detect a change in a three-dimensional orientation of the terminal device 200. Furthermore, in 5G, introduction of polarization multiple-input and multiple-output (MIMO) or polarization diversity using two orthogonal polarized waves has been studied. In view of such a situation, the terminal device 200 may re-establish the BPL state with the base station 100 also in consideration of a skew of polarization planes, for example, by detecting a change in a three-dimensional orientation of the terminal device 200.

(Modification 4: Example of Method of Detecting Change in Orientation)

Next, as modification 4, an example of a method of detecting the change in the orientation of the terminal device 200 will be described. In the embodiment described above, the example of the case of detecting the change in the orientation of the terminal device 200 (for example, the change in the orientation of the housing of the terminal device 200 or the antenna element supported by the housing) by the acceleration sensor, the gyro sensor, or the like has been described. Meanwhile, a configuration for detecting the change in the orientation of the terminal device 200 and a method of detecting the change in the orientation of the terminal device 200 are not particularly limited as long as the change in the orientation of the terminal device 200 can be detected. As a specific example, an image sensor, a sound wave sensor, a distance measurement sensor (for example, a time-of-flight (TOF) sensor), a pressure sensor, an optical sensor, and the like, may be used as the configuration for detecting the change in the orientation of the terminal device 200. Furthermore, a technology related to self-position estimation or environmental map generation may be used to detect the change in the orientation of the terminal device 200. As a more specific example, examples of a technology of simultaneously performing the self-position estimation and the environment map generation can include a technology called simultaneous localization and mapping (SLAM).

(Modification 5: An Example of Control at the Time of Recovery)

Next, as modification 5, an example of a case of applying the technology according to the present disclosure to a "beam failure recovery procedure" or a "recovery procedure from an RLF state" will be described. The "4-step RACH" applied as the random access procedure in the initial access procedure described above corresponds to contention base random access (CBRA). On the other hand, contention free random access (CFRA) is applied to the "beam failure recovery procedure" or the "recovery procedure from an RLF state". The CFRA is also applied to, for example, a random access procedure at the time of handover.

Figure 28:
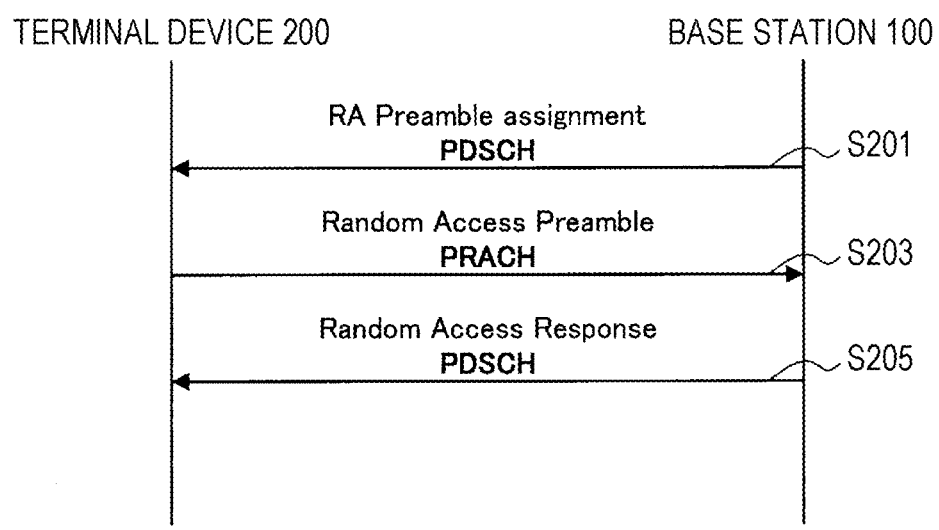
FIG. 28 is a schematic sequence diagram illustrating a flow of processing of contention free random access (CFRA).

For example, FIG. 28 is a schematic sequence diagram illustrating a flow of processing of the CFRA. Specifically, first, a resource for transmitting a random access preamble is allocated from the base station 100 to the terminal device 200 (S201). Next, the terminal device 200 performs PRACH transmission of the random access preamble to the base station 100 (S203). Thereafter, a PAR (individual signaling on a PDSCH) is transmitted from the base station 100 to the terminal device 200 (S205).

Note that in both of the CBRA and the CFRA, it may be difficult to maintain the BPL state between the base station 100 and the terminal device 200 due to the change in the orientation of the terminal device 200 caused by sudden rotation or the like, similarly to the random access procedure in the initial access procedure described in the embodiment described above. Therefore, by applying the technology according to the present disclosure regardless of either the CBRA or the CFRA, it becomes possible to immediately re-establish the BPL state between the base station 100 and the terminal device 200 even in a case where the orientation of the terminal device 200 changes, and it becomes thus possible to quickly complete the random access procedure. That is, in all of the "beam failure recovery procedure", the "recovery procedure from an RLF state", and a "random access procedure at the time of handover in an RRC CONNECTED state", the effect described above can be expected by applying the technology according to the present disclosure.

(Modification 6: Example of Beam Control According to Change in Orientation)

Next, as modification 6, an example of beam control according to the change in the orientation of the terminal device 200 will be described. As described above, the terminal device 200 according to the present embodiment maintains or re-establishes the BPL state with the base station 100 by controlling the direction in which the directional beam is directed according to the change in the orientation from the terminal device 200 from the reference state. Meanwhile, a configuration or a method for controlling the direction in which the directional beam is directed is not particularly limited as long as the direction in which the directional beam is directed can be controlled.

As a specific example, at least some of the antenna elements 210 may be configured as movable antenna elements whose positions or orientations can be controlled. In this case, for example, by changing the position or the orientation of the movable antenna element 210, the direction in which the directional beam is directed may be controlled.

Note that although details will be described later, a device applicable as the terminal device 200 is not limited to only a relatively small communication device such as a smartphone and the like, and a relatively large device such as, for example, a drone and the like can also be assumed as the device applicable as the terminal device 200. Such a device can also be controllably configured so that the directional beam is formed in a desired direction by controlling the position or the orientation of the movable antenna element 210 by driving a driving unit such as, for example, an actuator and the like.

5. Hardware Configuration

Figure 29:
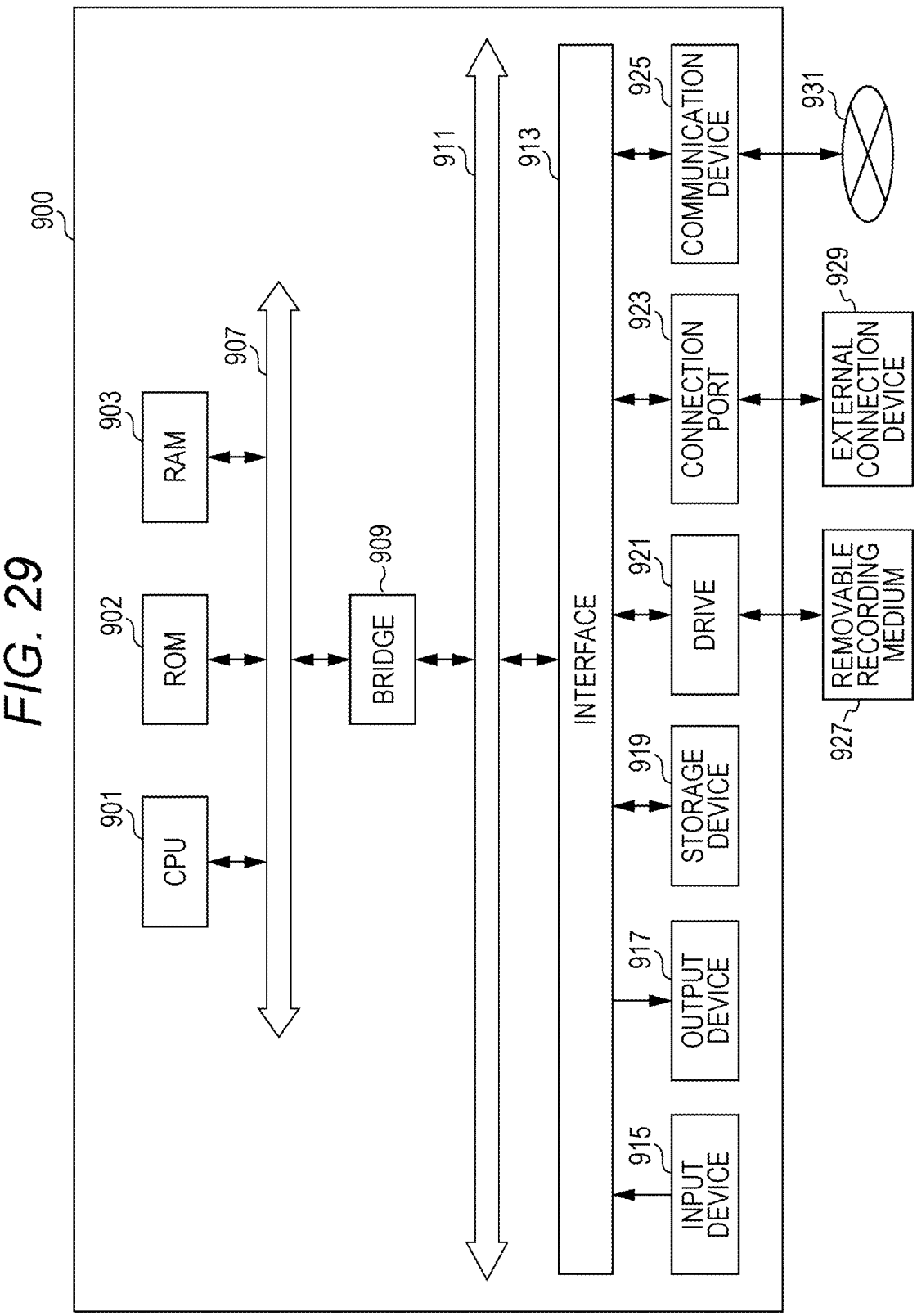
FIG. 29 is a functional block diagram illustrating a configuration example of a hardware configuration of an information processing device configuring the system according to the embodiment of the present disclosure.

Next, an example of a hardware configuration of an information processing device configuring the system according to the embodiment of the present disclosure, such as the base station 100 or the terminal device 200 described above, will be described in detail with reference to FIG. 29. FIG. 29 is a functional block diagram illustrating a configuration example of a hardware configuration of an information processing device configuring the system according to the embodiment of the present disclosure.

An information processing device 900 configuring the system according to the present embodiment mainly includes a central processing unit (CPU) 901, a read only memory (ROM) 902, and a random access memory (RAM) 903. Furthermore, the information processing device 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls all or some of operations in the information processing device 900 according to various programs recorded in the ROM 902, the RAM 903, the storage device 919, or a removable recording medium 927. The ROM 902 stores programs, operation parameters, or the like used by the CPU 901. The RAM 903 primarily stores programs used by the CPU 901, parameters that appropriately change during execution of the programs, or the like. The CPU 901, the ROM 902, and the RAM 903 are connected to each other by the host bus 907 including a CPU bus and the like. For example, the communication control unit 150 of the base station 100 illustrated in FIG. 2 or the communication control unit 250 of the terminal device 200 illustrated in FIG. 3 can be configured by the CPU 901.

The host bus 907 is connected to the external bus 911 such as a peripheral component interconnect/interface (PCI) bus and the like via the bridge 909. Furthermore, the input device 915, the output device 917, the storage device 919, the drive 921, the connection port 923, and the communication device 925 are connected to the external bus 911 via the interface 913.

The input device 915 is, for example, an operation means operated by the user, such as a mouse, a keyboard, a touch panel, a button, a switch, a lever, a pedal, and the like. Furthermore, the input device 915 may be, for example, a remote control means (so-called a remote control) using infrared rays or other electric waves, or may be an external connection device 929 such as a mobile phone, a personal digital assistants (PDA), or the like corresponding to an operation of the information processing device 900. Moreover, the input device 915 may include, for example, an input control circuit or the like that generates an input signal on the basis of information input by the user using the operation means described above and outputs the generated input signal to the CPU 901. The user of the information processing device 900 can input various data to the information processing device 900 or instruct the information processing device 900 to perform a processing operation by operating the input device 915.

The output device 917 is a device that can visually or auditorily notify the user of acquired information. Such a device includes a display device such as a cathode ray tube (CRT) display device, a liquid crystal display device, a plasma display device, an electroluminescence (EL) display device, a lamp or the like, an audio output device such as a speaker, a headphone or the like, a printer device, or the like. The output device 917 outputs, for example, results obtained by various processing performed by the information processing device 900. Specifically, the display device displays results obtained by the various processing performed by the information processing device 900 by texts or images. On the other hand, the audio output device converts an audio signal including reproduced audio data, sound data, or the like into an analog signal and outputs the analog signal.

The storage device 919 is a device for data storage configured as an example of a storage unit of the information processing device 900. The storage device 919 is configured by, for example, a magnetic storage unit device such as a hard disk drive (HDD) and the like, a semiconductor storage device, an optical storage device, a magneto-optical storage device, or the like. The storage device 919 stores programs executed by the CPU 901, various data, or the like. For example, the storage unit 140 of the base station 100 illustrated in FIG. 2 or the storage unit 240 of the terminal device 200 illustrated in FIG. 3 can be configured by any one of the storage device 919, the ROM 902, and the RAM 903 or can be configured by a combination of two or more of the storage device 919, the ROM 902, and the RAM 903.

The drive 921 is a reader/writer for a recording medium, and is embedded in or externally mounted on the information processing device 900. The drive 921 reads information recorded in the removable recording medium 927 such as a magnetic disk, optical disk, magneto-optical disk, semiconductor memory, or the like, that is mounted, and outputs the read information to the RAM 903. Furthermore, the drive 921 can also write a record to the removable recording medium 927 such as the magnetic disk, the optical disk, the magneto-optical disk, the semiconductor memory, or the like, that is mounted. The removable recording medium 927 is, for example, a digital versatile disk (DVD) medium, a high definition (HD)-DVD medium, a Blu-ray (registered trademark) medium, or the like. Furthermore, the removable recording medium 927 may be a Compact Flash (registered trademark) (CF), a flash memory, a secure digital (SD) memory card, or the like. Furthermore, the removable recording medium 927 may be, for example, an integrated circuit (IC) card on which a non-contact type IC chip is mounted, an electronic device, or the like.

The connection port 923 is a port for directly connecting to the information processing device 900. Examples of the connection port 923 include a universal serial bus (USB) port, an IEEE1394 port, a small computer system interface (SCSI) port, and the like. Other examples of the connection port 923 include a recommended standard (RS)-232C port, an optical audio terminal, a high-definition multimedia interface (HDMI) (registered trademark) port, and the like. By connecting the external connection device 929 to the connection port 923, the information processing device 900 acquires various data directly from the external connection device 929 or provides various data to the external connection device 929.

The communication device 925 is, for example, a communication interface including a communication device or the like for connecting to a communication network 931. The communication device 925 is, for example, a communication card and the like for wired or wireless local area network (LAN), Bluetooth (registered trademark), or wireless universal serial bus (WUSB). Furthermore, the communication device 925 may be a router for optical communication, a router for asymmetric digital subscriber line (ADSL), modems for various communications, or the like. The communication device 925 can transmit and receive a signal and the like, for example, to or from the Internet or another communication device according to a predetermined protocol such as, for example, transmission control protocol/Internet protocol (TCP/IP) and the like. Furthermore, the communication network 931 connected to the communication device 925 includes a network and the like connected in a wired or wireless manner, and may be, for example, the Internet network, a home LAN, an infrared communication network, a radio wave communication network, a satellite communication network, or the like. For example, the wireless communication unit 120 and the network communication unit 130 of the base station 100 illustrated in FIG. 2 or the wireless communication unit 220 of the terminal device 200 illustrated in FIG. 3 can be configured by the communication device 925.

Hereinabove, the example of the hardware configuration capable of realizing functions of the information processing device 900 configuring the system according to the present embodiment has been described. Each component described above may be configured using a general-purpose member or may be configured by hardware specialized for the function of each component. Therefore, it is possible to appropriately change the hardware configuration to be used according to a technical level at the time of carrying out the present embodiment. Note that although not illustrated in FIG. 29, various configurations corresponding to the information processing device 900 configuring the system are naturally provided.

Note that a computer program for realizing each function of the information processing device 900 configuring the system according to the present embodiment as described above can be created and mounted in a personal computer (PC) and the like. Furthermore, a computer readable recording medium in which such a computer program is stored can be provided. The computer readable recording medium is, for example, a magnetic disk, an optical disk, a magneto-optical disk, a flash memory, and the like. Furthermore, the computer program described above may be distributed via, for example, a network without using the computer readable recording medium. Furthermore, the number of computers that execute the computer program is not particularly limited. For example, a plurality of computers (for example, a plurality of servers and the like) may execute the computer program in cooperation with each other.

6. Application Example

Next, an application example of a communication device such as the terminal device 200 according to the embodiment of the present disclosure will be described.

6.1. Application Example 1: Application Example to Another Communication Device First, as application example 1, an example of a case of applying the technology according to the present disclosure to a device other than a communication terminal such as a smartphone will be described.

In recent years, a technology called Internet of Things (IoT) that connects various things to a network has attracted attention, such that it is assumed that a device other than a smartphone or a tablet terminal can be used for communication. Therefore, for example, by applying the technology according to the present disclosure to various devices configured to be movable, it becomes possible to realize communication using a millimeter wave in a more suitable manner also for the various devices.

Figure 30:
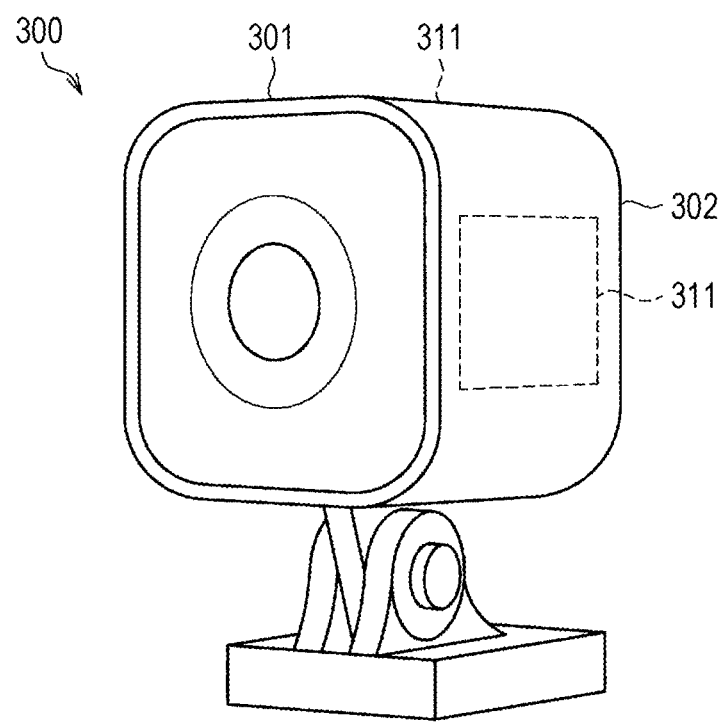
FIG. 30 is an explanatory diagram for describing an application example of a communication device according to the embodiment.

For example, FIG. 30 is an explanatory diagram for describing an application example of a communication device according to the present embodiment, and illustrates an example of a case of applying the technology according to the present disclosure to a camera device. Specifically, in the example illustrated in FIG. 30, antenna devices according to the embodiment of the present disclosure are held so as to be located near each of surfaces 301 and 302 facing directions different from each other among outer surfaces of a housing of a camera device 300. For example, reference numeral 311 schematically denotes the antenna device according to the embodiment of the present disclosure. With such a configuration, the camera device 300 illustrated in FIG. 30 can transmit or receive radio signals propagated in directions substantially coinciding with normal directions of the surfaces 301 and 302 in, for example, each of the surfaces 301 and 302. Note that it is needless to say that the antenna devices 311 may be provided not only on the surfaces 301 and 302 illustrated in FIG. 30 but also on other surfaces.

Under the configuration as described above, communication with another device (for example, a base station) using a directional beam is controlled according to a change in an orientation of the camera device 300 on the basis of the technology according to the present disclosure described above, such that it becomes possible to realize communication using a millimeter wave in a more suitable manner.

Figure 31:
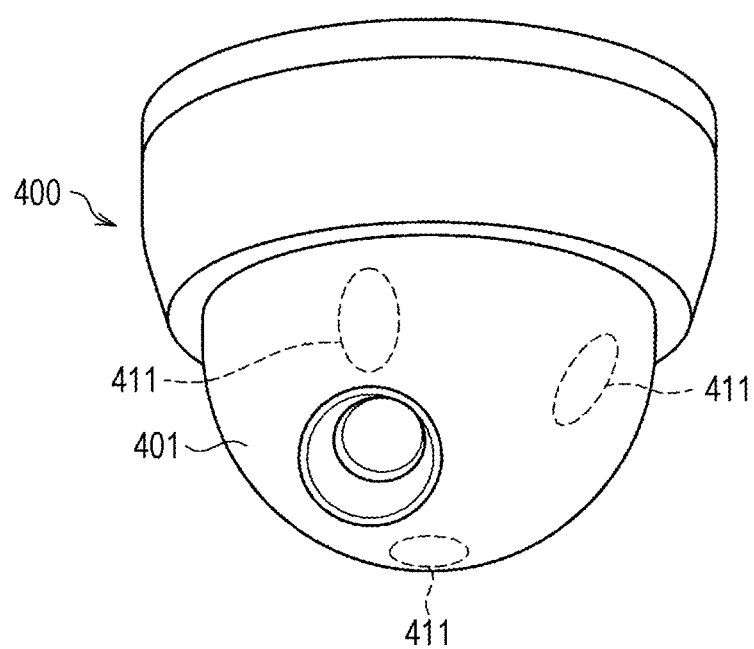
FIG. 31 is an explanatory diagram for describing an application example of a communication device according to the embodiment.

Furthermore, the technology according to the present disclosure can also be applied to an unmanned aerial vehicle or the like called a drone. For example, FIG. 31 is an explanatory diagram for describing an application example of a communication device according to the present embodiment, and illustrates an example of a case of applying the technology according to the present disclosure to a camera device installed at a lower portion of a drone. Specifically, in a case of the drone flying in a high place, it is desirable that the drone can transmit or receive radio signals (millimeter waves) arriving at the drone from each direction mainly on a lower side of the drone. Therefore, for example, in the example illustrated in FIG. 31, antenna devices according to the embodiment of the present disclosure are held so as to be located near each of portions facing directions different from each other in an outer surface 401 of a housing of a camera device 400 installed at a lower portion of the drone. For example, reference numeral 411 schematically denotes the antenna device according to the embodiment of the present disclosure. Furthermore, although not illustrated in FIG. 31, the antenna devices 411 may be provided not only on the camera device 400 but also on, for example, each portion of a housing of the drone itself. Also in this case, the antenna device 411 is only required to be provided, particularly on a lower side of the housing.

Note that in a case where at least a part of an outer surface of a housing of a device that is a target is configured as a surface (that is, a curved surface) that is curved, as illustrated in FIG. 31, the antenna devices 411 are only required to be held near each of a plurality of partial regions whose normal directions intersect with each other or the normal directions are skew to each other among respective partial regions in the curved surface. With such a configuration, the camera device 400 illustrated in FIG. 31 can transmit or receive radio signals propagated in directions substantially coinciding with the normal directions of each partial region.

Under the configuration as described above, communication with another device (for example, a base station) using a directional beam is controlled according to a change in an orientation of the drone on the basis of the technology according to the present disclosure described above, such that it becomes possible to realize communication using a millimeter wave in a more suitable manner.

Of course, the example described with reference to FIGS. 30 and 31 is merely an example, and an application destination of the technology according to the present disclosure is not particularly limited as long as it is a device performs communication using a millimeter wave. For example, a business area newly added in 5G includes a variety of fields such as, for example, an automobile field, an industrial equipment field, a home security field, a smart meter field, and other IoT fields, and the technology according to the present disclosure can be applied to communication terminals applied in each field. As a more specific example, application examples of the technology according to the present disclosure can include a head-mounted wearable device used for realizing augmented reality (AR) or virtual reality (VR) or various wearable devices used in telemedicine and the like. Furthermore, in recent years, so-called autonomous robots such as a customer service robot, a pet type robot, a work robot, and the like, have also been variously proposed, and even if such a robot has a communication function, and the technology according to the present disclosure can also be applied to such robots in a case where such robots have a communication function. Furthermore, the technology according to the present disclosure may be applied not only to the drone described above but also to various moving objects such as, for example, an automobile, a motorcycle, a bicycle, and the like.

Hereinabove, as application example 1, the example of the case of applying the technology according to the present disclosure to the device other than the communication terminal such as the smartphone has been described with reference to FIGS. 30 and 31.

6.2. Application Example 2: Application Example to Communication Based on Another Communication Standard Next, as application example 2, an example of a case of applying the technology according to the present disclosure to communication other than communication using a millimeter wave in 5G will be described, particularly focusing on application to communication based on another communication standard.

Furthermore, in the above, the example of the case of applying the technology according to the present disclosure to the communication using the millimeter wave between the base station and the terminal device has been described, mainly focusing on a 5G wireless communication technology. Meanwhile, an application of the technology according to the present disclosure is not necessarily limited to only the communication between the base station and the terminal device or the communication using the millimeter wave, as long as it is communication that uses a directional beam.

As a specific example, the technology according to the present disclosure can be applied to communication based on an IEEE 802.11ad standard using a 60 GHz band, communication based on an IEEE 802.11ay standard for which standardization work is ongoing, or the like, among wireless communication based on the Wi-Fi (registered trademark) standard.

In the IEEE 802.11ad standard and the IEEE 802.11ay standard, an influence of free space reduction, absorption by oxygen, rainfall attenuation, and the like is large, and a beamforming technology is thus used, similarly to the 5G wireless communication technology described above. As a specific example, a beamforming procedure in the IEEE 802.11ad standard is mainly divided into two steps, that is, a sector level sweep (SLS) and a beam refinement protocol (BRP).

More specifically, in the SLS, a search for a communication partner is performed and communication is started. The number of sectors is defined to be up to 64 in one ANT and be up to 128 in total of all ANTs. The BRP is appropriately performed after the SLS ends, for example, after a ring is cut, or the like. Such an operation is similar to a mechanism in which a BPL is established by a wide beam in an operation based on an IA procedure in communication using a millimeter wave in 5G and a BPL in a narrow beam is established by an operation of beam refinement (BR) in beam management (BM) in a CONNECTED mode.

The IEEE 802.11ay standard is being formulated at present, but speed-up of a data rate is being studied by a combination of a channel bonding technology or higher-order modulation, similarly to "contiguous" "intra-CA" in communication using a millimeter wave in 5G.

From the characteristic as described above, the technology according to the present disclosure described above can also be applied to communication based on the IEEE 802.11ad standard or the IEEE 802.11ay standard.

Of course, the technology according to the present disclosure can also be applied to standards succeeding the various standards described above in a case where communication using a directional beam is assumed. In particular, in wireless communication using a frequency band exceeding a millimeter wave, an influence of free space reduction, absorption by oxygen, rainfall attenuation, and the like, is larger than that in the communication using the millimeter wave, and it is thus presumed that a possibility that the beamforming technology will be applied is high.

Hereinabove, as application example 2, the example of the case of applying the technology according to the present disclosure to the communication other than the communication using the millimeter wave in 5G has been described, particularly focusing on the application to the communication based on another communication standard.

7. End

As described above, in the system according to the present embodiment, the terminal device includes the one or more antenna elements, the detection unit, and the control unit. The one or more antenna elements described above are configured to control the directions of the directional beams, and perform the wireless communication using the directional beams. The detection unit detects the orientation of at least any one of the one or more antenna elements described above. The control unit sets the state in which the radio signal transmitted using at least the directional beam from the base station can be received via any one of the one or more antenna elements described above as the reference state, and controls the wireless communication with the base station using the directional beam according to the change in the orientation described above from the reference state. More specifically, the control unit selectively switches the antenna element used for the wireless communication with the base station among the plurality of antenna elements according to the change in the orientation of at least any one of the plurality of antenna elements that performs the wireless communication using the directional beams directed in the respective directions different from each other. Furthermore, the control unit may control the direction of the directional beam formed by the antenna element according to the change in the orientation of at least any one of the one or more antenna elements described above.

With the above configuration, the terminal device can re-establish the BPL state with the base station before the call disconnection due to the RLF occurs, for example, even though the beam failure occurs due to the change in the orientation of the terminal device caused by the sudden rotation or the like. Furthermore, ideally, the terminal device can re-establish the BPL state with the base station before the occurrence of the beam failure even though the orientation of the terminal device changes due to the sudden rotation or the like. That is, according to the system according to the present embodiment, it becomes possible to realize the wireless communication using the directional beam between the base station and the terminal device in a more suitable manner. As a result, it becomes possible to always operate only the minimum required millimeter wave antenna array/subset modules while maintaining a correct BPL state, and it becomes thus possible to reduce power consumption by turning off other millimeter wave antenna modules. Therefore, it is also possible to expect an effect of extending the battery life of the terminal device side which is a mobile device. Moreover, some millimeter wave antenna array/subset modules are turned off, such that it is also possible to expect an effect of reducing the processing load.

Hereinabove, the preferred embodiments of the present disclosure have been described in detail with reference to the accompanying drawings, but the technical scope of the present disclosure is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

Furthermore, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

A wireless communication device including:

one or more antenna elements that are configured to control directions of directional beams and perform wireless communication using the directional beams;

a detection unit that detects an orientation of at least any one of the one or more antenna elements; and a control unit that sets a state in which a radio signal transmitted using at least a directional beam from a base station is receivable via any one of the one or more antenna elements as a reference state, and controls the wireless communication with the base station using the directional beam according to a change in the orientation from the reference state.

(2)

The wireless communication device according to the above (1), in which a plurality of antenna elements that performs the wireless communication using directional beams directed in respective directions different from each other, is provided as the one or more antenna elements, and the control unit selectively switches an antenna element used for the wireless communication with the base station among the plurality of antenna elements according to the change in the orientation of at least any one of the plurality of antenna elements.

(3)

The wireless communication device according to the above (2), in which the control unit controls a direction of a directional beam formed by the antenna element according to a state of the wireless communication with the base station after the switching, in a case where the control unit has switched the antenna element used for the wireless communication with the base station among the plurality of antenna elements.

(4)

The wireless communication device according to the above (1), in which the control unit controls a direction of a directional beam formed by the antenna element according to the change in the orientation of at least any one of the one or more antenna elements.

(5)

The wireless communication device according to the above (1), in which at least some of the one or more antenna elements are configured as movable antenna elements, and the control unit controls a direction of a directional beam formed by the movable antenna element by controlling at least one of a position or an orientation of the movable antenna element according to the change in the orientation of at least any one of the one or more antenna elements.

(6)

The wireless communication device according to any one of the above (1) to (5), in which the reference state is a state in which reception power of the radio signal transmitted using the directional beam from the base station is equal to or larger than a threshold.

(7)

The wireless communication device according to any one of the above (1) to (5), in which the reference state is a state in which a signal block transmitted from the base station for every directional beam using a synchronization signal and a control signal as one unit is receivable.

(8)

The wireless communication device according to any one of the above (1) to (7), in which the control unit sets the reference state when executing an initial access procedure to the base station.

(9)

The wireless communication device according to the above (8), in which the control unit sets the reference state after a transmission opportunity of a preamble to the base station in the procedure.

(10)

The wireless communication device according to any one of the above (1) to (7), in which the control unit sets the reference state when executing a procedure for establishing or restoring communication using a directional beam with the base station.

(11)

The wireless communication device according to the above (10), in which the control unit sets the reference state after an opportunity to select a directional beam used for communication with the base station among directional beams formed in each of a plurality of directions by the base station, in the procedure.

(12)

The wireless communication device according to any one of the above (1) to (11), in which the control unit detects the change in the orientation from the reference state on the basis of a detection result of the orientation by the detection unit, using a predetermined event as a trigger.

(13)

The wireless communication device according to the above (12), in which the event is an event notification of which is provided in a case where a deviation occurs between the directional beam formed by the antenna element and the directional beam formed by the base station.

(14)

The wireless communication device according to any one of the above (1) to (11), in which the control unit detects the change in the orientation from the reference state by monitoring a detection result of the orientation by the detection unit.

(15)

A control device including:

an acquisition unit that acquires a detection result of an orientation of at least any one of one or more antenna elements configured to control directions of directional beams and performing wireless communication using the directional beams; and a control unit that sets a state in which a radio signal transmitted using at least a directional beam from a base station is receivable as a reference state, and controls the wireless communication with the base station using the directional beam according to a change in the orientation from the reference state.

(16)

A control method executed by a computer, including:

acquiring a detection result of an orientation of at least any one of one or more antenna elements configured to control directions of directional beams and performing wireless communication using the directional beams; and setting a state in which a radio signal transmitted using at least a directional beam from a base station is receivable as a reference state and controlling the wireless communication with the base station using the directional beam according to a change in the orientation from the reference state.

REFERENCE SIGNS LIST

1 System
100 Base station
110 Antenna unit
120 Wireless communication unit
130 Network communication unit
140 Storage unit
150 Communication control unit
200 Terminal device
210 Antenna unit
220 Wireless communication unit
230 Detection unit
240 Storage unit
250 Communication control unit

The invention claimed is:

1. A wireless communication device comprising:
a plurality of antenna elements that are configured to control directions of directional beams and perform wireless communication using the directional beams directed in respective directions different from each other; and
processing circuitry configured to:
detect an orientation of at least any of the plurality of antenna elements;
set a state in which a radio signal transmitted using at least a directional beam from a base station is receivable via a first antenna element among the plurality of antenna elements as a reference state; and
control the wireless communication with the base station using the directional beam according to a change in the orientation from the reference state including selectively switching to a second antenna element different from the first antenna element among the plurality of antenna elements for the wireless communication with the base station according to the change in the orientation of at least any one of the plurality of antenna elements and the directional beam directions of the plurality of antenna elements relative to the base station;
wherein the processing circuitry is further configured to control a direction of a directional beam formed by the second antenna element according to the change in the orientation of at least any one of the plurality of antenna elements;
wherein at least some of the plurality of antenna elements are configured as movable antenna elements, and the processing circuitry is further configured to control a direction of a directional beam formed by the movable antenna element by controlling at least one of a position or an orientation of the movable antenna element according to the change in the orientation of at least any one of the plurality of antenna elements.

2. The wireless communication device according to claim 1, wherein the processing circuitry is further configured to control a direction of a directional beam formed by the second antenna element according to a state of the wireless communication with the base station after the switching, in a case where the circuitry has switched to the second antenna element for the wireless communication with the base station.

3. The wireless communication device according to claim 1, wherein the reference state is a state in which reception power of the radio signal transmitted using the directional beam from the base station is equal to or larger than a threshold.

4. The wireless communication device according to claim 1, wherein the reference state is a state in which a signal block transmitted from the base station for every directional beam using a synchronization signal and a control signal as one unit is receivable.

5. The wireless communication device according to claim 1, wherein the processing circuitry is further configured to set the reference state when executing an initial access procedure to the base station.

6. The wireless communication device according to claim 5, wherein the processing circuitry is further configured to set the reference state after a transmission opportunity of a preamble to the base station in the procedure.

7. The wireless communication device according to claim 1, wherein the processing circuitry is further configured to set the reference state when executing a procedure for establishing or restoring communication using a directional beam with the base station.

8. The wireless communication device according to claim 7, wherein the processing circuitry is further configured to set the reference state after an opportunity to select a directional beam used for communication with the base station among directional beams formed in each of a plurality of directions by the base station, in the procedure.

9. The wireless communication device according to claim 1, wherein the processing circuitry is further configured to detect the change in the orientation from the reference state on a basis of a detection result of the orientation, using a predetermined event as a trigger.

10. The wireless communication device according to claim 9, wherein the event is an event notification of which is provided in a case where a deviation occurs between the directional beam formed by the first antenna element and the directional beam formed by the base station.

11. The wireless communication device according to claim 1, wherein the processing circuitry is further configured to detect the change in the orientation from the reference state by monitoring a detection result of the orientation.

12. A control device comprising a processing circuitry configured to:
acquire a detection result of an orientation of at least any one of a plurality of antenna elements configured to control directions of directional beams and performing wireless communication using the directional beams, the directional beams of the plurality of antenna elements being directed in respective directions different from each other;
set a state in which a radio signal transmitted using at least a directional beam from a base station is receivable as a reference state; and
control the wireless communication with the base station using the directional beam according to a change in the orientation from the reference state including selectively switching from a first antenna element to a second antenna element among the plurality of antenna elements for the wireless communication with the base station according to the change in the orientation of at least any one of the plurality of antenna elements and the directional beam directions of the plurality of antenna elements relative to the base station;
wherein the processing circuitry is further configured to control a direction of a directional beam formed by the second antenna element according to the change in the orientation of at least any one of the plurality of antenna elements;
wherein at least some of the plurality of antenna elements are configured as movable antenna elements, and the processing circuitry is further configured to control a direction of a directional beam formed by the movable antenna element by controlling at least one of a position or an orientation of the movable antenna element according to the change in the orientation of at least any one of the plurality of antenna elements.

13. A control method, by a computer, comprising:
acquiring a detection result of an orientation of at least any one of a plurality of antenna elements configured to control directions of directional beams and performing wireless communication using the directional beams, the directional beams of the plurality of antenna elements being directed in respective directions different from each other;

setting a state in which a radio signal transmitted using at least a directional beam from a base station is receivable as a reference state; and controlling the wireless communication with the base station using the directional beam according to a change in the orientation from the reference state including selectively switching from a first antenna element to a second antenna element among the plurality of antenna elements for the wireless communication with the base station according to the change in the orientation of at least any one of the plurality of antenna elements and the directional beam directions of the plurality of antenna elements relative to the base station;

wherein the processing circuitry is further configured to control a direction of a directional beam formed by the second antenna element according to the change in the orientation of at least any one of the plurality of antenna elements;

wherein at least some of the plurality of antenna elements are configured as movable antenna elements, and the processing circuitry is further configured to control a direction of a directional beam formed by the movable antenna element by controlling at least one of a position or an orientation of the movable antenna element according to the change in the orientation of at least any one of the plurality of antenna elements.

* * * * *